(12) United States Patent
Waclawsky et al.

(10) Patent No.: US 9,875,637 B1
(45) Date of Patent: Jan. 23, 2018

(54) SYSTEMS, APPARATUSES, AND METHODS FOR DETECTING PROBLEMS IN AIR

(71) Applicant: Echelon Corporation, Santa Clara, CA (US)

(72) Inventors: John G. Waclawsky, Alpine, WY (US); Sohrab Modi, Oakland, CA (US)

(73) Assignee: Echelon Corporation, Santa Clara, CA (US)

( * ) Notice: Subject to any disclaimer, the term of this patent is extended or adjusted under 35 U.S.C. 154(b) by 0 days.

(21) Appl. No.: 15/226,801

(22) Filed: Aug. 2, 2016

(51) Int. Cl.
*G08B 21/18* (2006.01)
*H05B 37/02* (2006.01)
*H05B 33/08* (2006.01)
*F21K 9/278* (2016.01)
*G01K 13/00* (2006.01)
*F21Y 115/10* (2016.01)

(52) U.S. Cl.
CPC .......... *G08B 21/182* (2013.01); *F21K 9/278* (2016.08); *G01K 13/00* (2013.01); *H05B 33/0845* (2013.01); *H05B 33/0857* (2013.01); *H05B 37/0263* (2013.01); *H05B 37/0272* (2013.01); *F21Y 2115/10* (2016.08)

(58) Field of Classification Search
CPC ............ H05B 33/0845; H05B 33/0857; H05B 37/0263; H05B 37/0272; G01K 13/00; G08B 21/182
See application file for complete search history.

(56) References Cited

U.S. PATENT DOCUMENTS

| | | | |
|---|---|---|---|
| 2009/0059603 A1* | 3/2009 | Recker | H05B 37/0272 362/362 |
| 2010/0302545 A1* | 12/2010 | Kajino | G01N 21/538 356/436 |
| 2011/0187543 A1* | 8/2011 | Russo | G08B 17/10 340/628 |
| 2011/0298371 A1* | 12/2011 | Brandes | F21V 29/51 315/32 |

* cited by examiner

*Primary Examiner* — Leon Flores
(74) *Attorney, Agent, or Firm* — Nicholson De Vos Webster & Elliott LLP

(57) ABSTRACT

The combination of LED lighting and particulate detectors are enhanced by exploiting the light degradation/reflection/wavelengths detected, absorbed or frequency shift seen in lighting due to the presence of smoke, gas or other molecules (such as explosives) in the air can be detected. The use of LEDs is expanded well beyond simple lighting and energy savings to include not only smoke and fire detection by also to scan for gases and particulates found based in the usage environment.

16 Claims, 23 Drawing Sheets

| PROFILE(S) 401 | | | | | |
|---|---|---|---|---|---|
| NAME | WIRELESS ID | ALLOWED COMMAND(S) | PRIORITY | DURATION | LIGHTING CONFIG(S) |
| GLOBAL | ANY | PROXIMITY | 1 | 15 MIN. | LC1 |
| USER 1 | 501 | PROXIMITY OFF/ON TIMER DIM | 2 | 30 MIN. | LC3 |
| USER 2 | 502 | PROXIMITY DIM | 3 | 15 MIN. | LC1, LC2 |
| ADMIN | 101 | ALL | 0 | 15 MIN. | LC1, LC2, LC3 |
| DEFAULT | NONE | NONE | 5 | NONE | LC0 |

FIG. 5

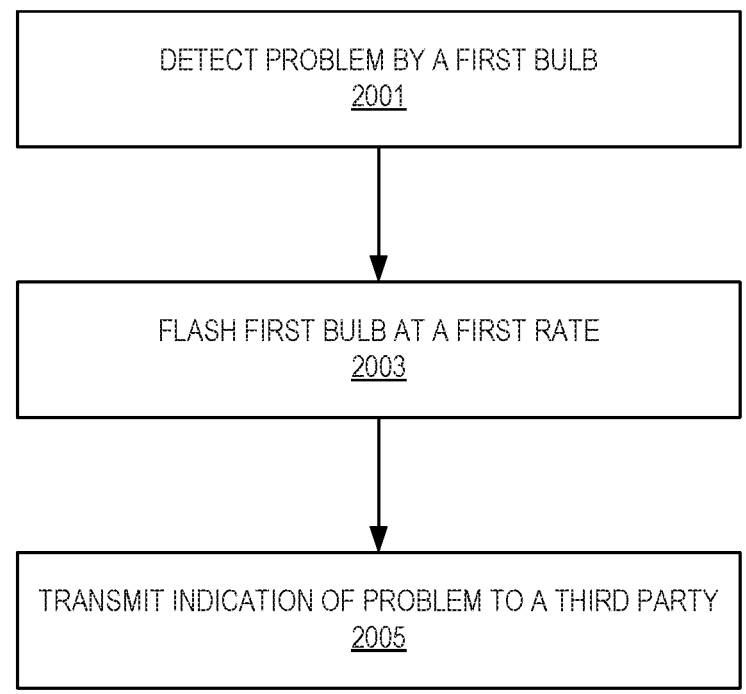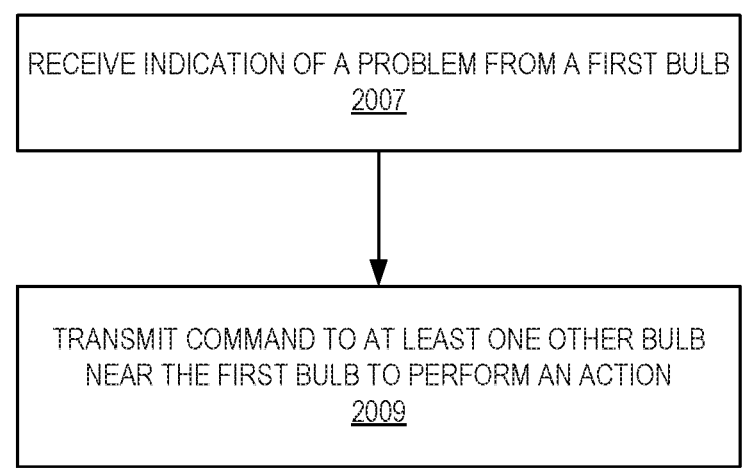
FIG. 20

SYSTEMS, APPARATUSES, AND METHODS FOR DETECTING PROBLEMS IN AIR

FIELD OF INVENTION

The field of invention relates generally to device control, and, more specifically, to the exploiting the ubiquity and augmenting the function of lightbulbs.

BACKGROUND

Many open office space areas are very large. For example, in an area of 30,000 sq./ft. there may be 100-200 partitioned work spaces. Most open office area lighting, smoke, fire and gas detector deployments are controlled by a few switches, circuits or circuit breakers for the whole space. This provides an all or nothing approach to controlling overhead lights and other detectors in theses spaces.

BRIEF DESCRIPTION OF THE DRAWINGS

The present invention is illustrated by way of example and not limitation in the figures of the accompanying drawings, in which like references indicate similar elements and in which:

FIG. 5 illustrates an embodiment of profiles used by a wireless controller software;

FIG. 20 illustrates an embodiment of a method;

DETAILED DESCRIPTION

Figure 1:
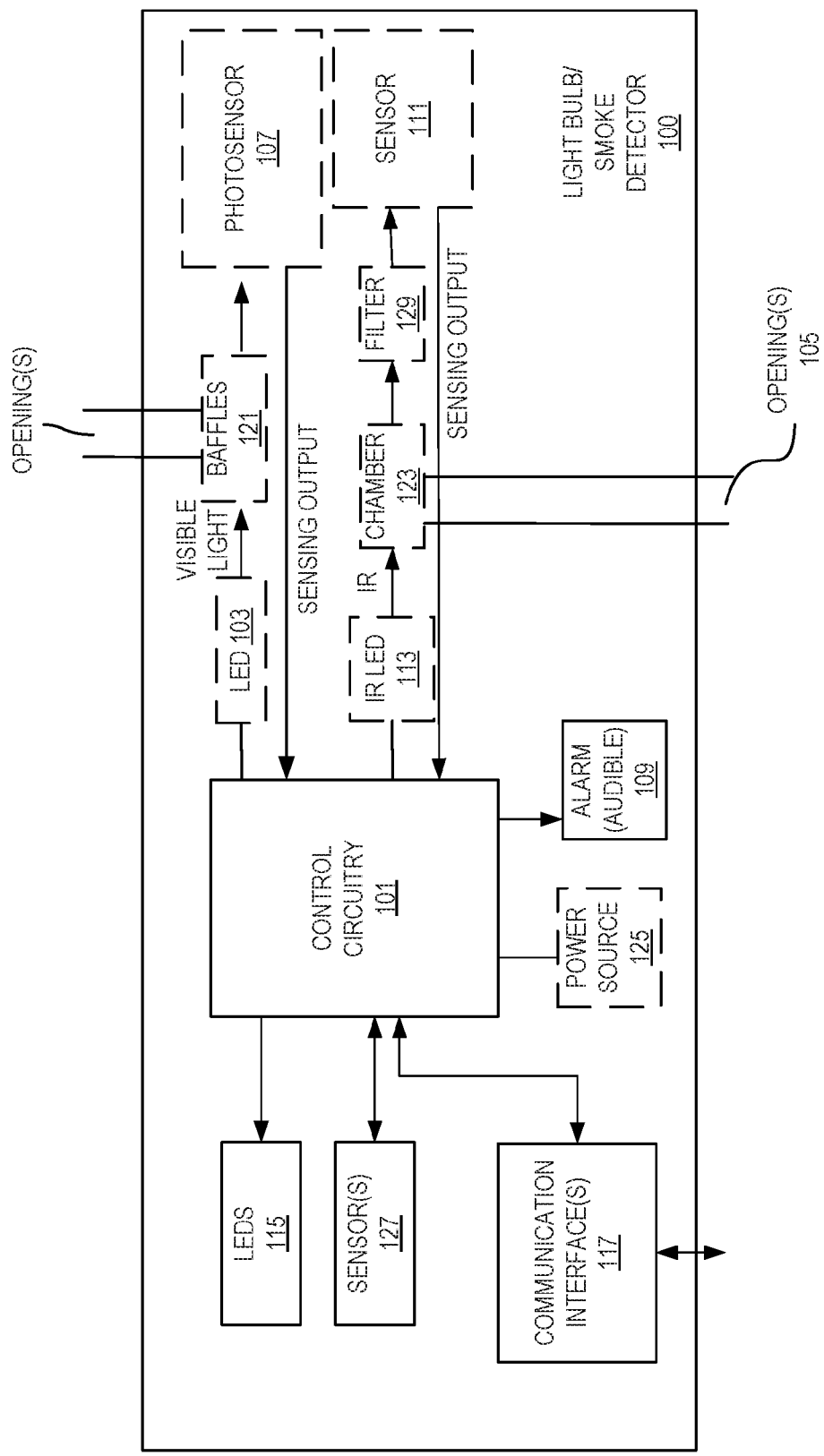
FIG. 1 illustrates an embodiment of a light bulb and smoke/gas/particulate detector (LBSD)

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

There are numerous approaches to try to detect fire, smoke, gas and/or other particulates in individual work areas. These approaches generally include smoke detectors, carbon monoxide detectors, gas detectors etc. that are strategically placed above or in the work space where sources of heat, fumes, gases, and particulates from devices such as printers, computers, fax machines and other office or industrial equipment is located. Then wiring them together to work as a coordinated unit is very difficult. Additionally, if the freestanding work spaces and equipment are moved around, all the wiring must be modified to maintain the previous amount of functionality and control. The cost and difficulty of maintaining wiring connections often means equipment will be moved but adequate control and sensor protection may be sacrificed. Detailed below are embodiments of systems, apparatuses, and method to provide a means to incorporate into lighting the ability to detect smoke, gas and other particulates in the air and network them together to provide a flexible and coordinated solution to detecting problems in the air along with lighting control.

Most of the light provided from ceiling fixtures mounted above work areas originates from T-8 fluorescent bulbs. Typically, there are four bulbs in a fixture with more than one fixture above the work space. Replacing the T-8 fluorescent bulbs in the fixtures with T-8 LED replacement bulbs that are each equipped with an embedded, wireless controller in each individual bulb allows benefits such as eliminating most, if not all, control wiring for the bulbs and any associated sensors embedded in the bulbs.

Bulbs can be grouped within fixtures (e.g., 4/fixture) and fixtures can be grouped into work spaces, etc. All fixtures (and even individual bulbs) are networkable such that a controller on each floor and/or a Central Management System (CMS) can become a reporting and analysis point for any sensor data as well as provide the operating properties that the "occupied" work space may use to control their lights and any embedded sensors within the work space. Bulbs with sensors can be easily mixed and matched as well as networked with other non-sensor carrying lights. Further, the CMS could provide all control if needed.

FIG. 1 illustrates an embodiment of a light bulb and smoke/gas/particulate detector (LBSD) 100. A LBSD is of any shape with any connector (for electrical or network connectivity) including, but not limited to, a series e.g., A19, r series, t series (T8, T14, etc.), coil, par series, etc. The LBSD includes at least one base connector such as a screw base (E10, E11, E12, E14, E17, E26, E27, etc.), twist & lock base, bi pin base, fluorescent pin base (e.g., mini bi-pin, recessed DC, medium bi-pin, single bi-pin, etc.), compact fluorescent plug in lamp base, etc. Typically, this LBSD 100 includes a plurality of light emitting diodes (LEDs) 115. A control circuitry 101 includes circuitry (or is coupled to such circuitry) to drive the LEDs 115 which provide external light. The driver circuitry may be a sink or a source and varies depending upon the standard used by the bulb. In the IEC standard 60929, the LED driver circuitry sources the current, and the control sinks the current. At 10V, LEDs will be on at full, and at 1V or below, LEDs go to a minimum level, not necessarily off. With the ESTA (Entertainment Services & Technology Association) E1.3 standard, the control sources the current, and the driver sinks the current. At 10V, LEDs will be on at full, and at 0V or below, LEDs go to off.

In some embodiments, control circuitry 101 the LEDs 103 and 113 is periodically adjusted to supply different mixes of wavelengths and wavelength intensities to help the sensors 107 and 111 search for known absorption and scattering signatures of substances in the air such as gases or known harmful elements (i.e., carcinogens such as lead fibers, exhaust gases, explosive residues, etc.), which will scatter and/or absorb some wavelengths of light more than others. Specific detectors, such as photo sensors, could be placed into the sensor chamber looking for specific wavelength scattering or absorption signatures of specific substances. Even atmospheric gases such as oxygen levels can be determined which can be useful for monitoring enclosed areas such as office environments, hospital settings, aircraft, mining etc. The LEDs 103 and 113 could be controlled by programming or circuitry in the control circuitry 101 to loop through light frequencies to actively search for particular harmful substances based on the environment where they are located (public locations for explosives, methane or CO2 in a mine, fumes or lack of oxygen in a plane, or mold, mildew, CO, gases in "sick" homes or "sick" office buildings, etc.). When the photosensors 107 or 111 capture the light wavelength absorption and scattering information it can be compared, either to expected healthy air quality measurements (e.g., "a gold standard" pre-loaded into the control circuitry logic) or compared to an earlier baseline measurement taken when first activated and then monitor for changes. From subsequent measurements any scattering pattern differences or absorbed or reduced light wavelength information acts as a wavelength signature of either a change from the baseline measurement or represents the presence of a gas or harmful particulate (a potential carcinogen or presence of explosives) when analyzed by the control circuitry.

The control circuitry 101 also drives one or more internal LEDs 103 and 113 to be used in gas or particulate detection allowed through one or more openings 105. In some embodiments, LED 103 provides visible light through baffles 121. A photosensor 107 analyzes the light passing though the baffles 121, and/or detects reflections in the baffles 121 and provides sensing output to the control circuitry 101. In some embodiments, the photosensor 107 is off-axis to the LED 103.

Figure 2:
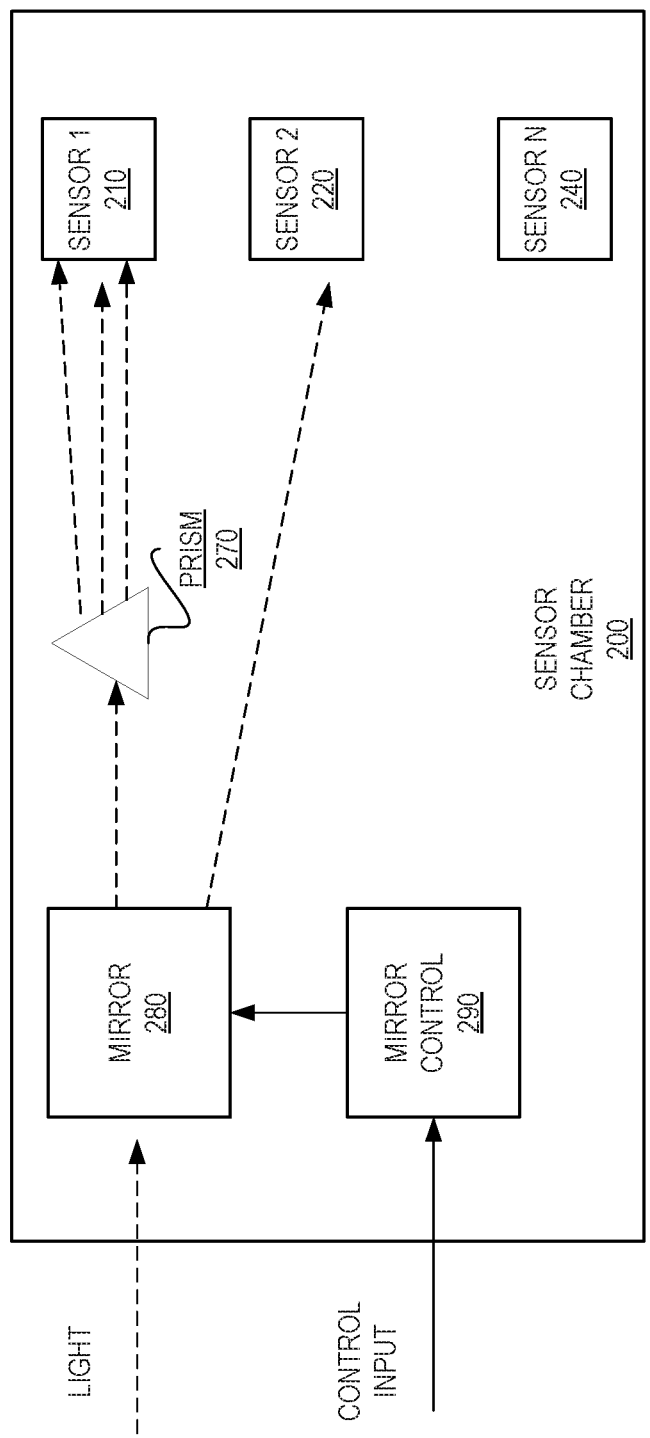
FIG. 2 illustrates an embodiment wherein a photosensor is replaced with a sensor chamber.

FIG. 2 illustrates an embodiment wherein a photosensor is replaced with a sensor chamber 200. The sensor chamber contains multiple sensors designed to identify scatter patterns and absorption characteristics carried by different light wavelengths. The sensor chamber may house an array of photo-sensors 210, 220, and 240 designed to sample and analyze specific wavelengths of any received light. Light can be directed onto the photosensors via a movable mirror 280 guided by the mirror control 290 using "control input" from 101 (not shown in FIG. 1). Each photosensor 210, 220, and 240 analyzes specific light characteristics of received light directed to it by the mirror. Each sensor looks for different characteristics. In some embodiments, the mirror directs light through a prism 270 to separate light components and detect absorption patterns.

The control circuitry 101 uses this sensing output to determine if there is gas or particulates in the air, etc. In some embodiments, infrared (IR) LED 113 or a UV LED (not shown) provides IR or UV light wavelengths through baffles chamber 123 and, in some embodiments, a filter 129. A photosensor 111 analyzes the wavelengths of light passing though the baffles chamber 123 (and filter 129 if used), and/or detects reflections in the baffles chamber 123 and to provides sensing output to the control circuitry 101 based on scattering or absorption of gas or particulate detected. The sensor 111 could also be replaced with a sensor chamber 200. The sensor chamber guided by the control circuitry 101 may contain mirrors, multiple sensors, and/or prisms to identify wavelength scatter patterns and absorption characteristics carried in the light as discussed previously. In some embodiments, a parallel "control" chamber and sensor are included in the LBSD and are utilized as a reference for detection and calibration. The control chamber may receive light from a different source than the baffles chamber 123. The control circuitry 101 uses this output to determine if there is gas or particulate in the air and the type, etc. In some embodiments, non-LED light sources are used in gas or particulate detection. Depending upon the embodiment, the control circuitry 101 provides one or more of the following functions for the LEDs 103 and/or 113: 0-10V dimming control, white tuning (2 0-10V connections), digital addressable lighting interface (DALI) control, and on/off functionality and expanded digital control using Pulse Width Modulation (PWM) or other digital LED control techniques.

The control circuitry 101 may also be coupled to interface(s) 117. This interface 117 (or interfaces) allows for functional commands to be received by the LBSD (to be acted upon by the control circuitry 101 as detailed below) For example, the control circuitry 101 may act on a received command to turn off or on the bulb, dim the bulb, or provide color changing and intensity by passing embedded commands transmitted using the wireless connection. In some embodiments, the LBSD supports one or more of 0-10V dimming control, white tuning, or DALI control of the LEDS 115. The interface(s) 117 may include one or more radio frequency (RF) components to receive lighting commands from RF devices such as Bluetooth® and Bluetooth® Low Energy (BLE) (such as that maintained by Institute of Electrical and Electronics Engineers (IEEE) standard 802.15.1 and the Bluetooth SIG); Wi-Fi (IEEE 802.11); INSTEON; Infrared Data Association (IrDA); wireless USB; z-wave; Radio Frequency for Consumer Electronics (RF4CE); and ZigBee (IEEE 802.15.4 based) devices and communicate those commands to the LED control circuitry 101. Typically, the RF device in communication with the LBSD is a wireless personal area network (WPAN) device. In some embodiments, LBSD includes a powerline communication or other physical interfaces. The interface(s) 117 also supports transmitting commands and/or notifications to devices external to the LBSD as detailed herein. In some embodiments, data from the sensors is transmitted from the LBSD to an external device for processing (for example, where a more powerful processor is located to analyze the sensor data).

The LBSD 100 includes an audible alarm 109 coupled to the control circuitry 101. This alarm may sound based upon a detection of airborne particulate by this LBSD or other particulate detecting devices that communicate that information to the LBSD. The alarm can sound or vibrate at any number of frequencies to provide information concerning the type of problem being detected.

In some embodiments, commands handled by LBSD are relatively simple. For example, turning off/on, dimming, changing color, etc. However, in other embodiments, commands handled by the LBSD are more complex. For example, a command may include one or more additional attributes including, but not limited to, duration, priority, frequency, etc. As an example, a command may indicate that a LBSD is to be turned on for a duration of 10 minutes before turning off at a frequency of every hour unless a command of a higher priority is received. As other examples, a command may cause an LBSD to dim for 5 or 10 minutes before turning off, or only allow the LBSD to come on when a sensor indicates more light is needed, only allow a light to come on only if motion was recently detected, etc.

Additionally, in some embodiments, a power source 125 is included to power some or all of the control circuitry 101, sensors 107, 111, and 127, and interface(s) 117. Typically, this power source 125 converts AC voltage to DC voltage to power the controller(s) and/or sensors. Note the illustration does not show all connections to the power storage including connections to the sensors 107 and 111.

In some embodiments, the power source 125 includes power storage to provide power when power from wiring coupled to the LBSD is not available. Examples of power sources include a battery, capacitor, super capacitor, etc.

In some embodiments, functionality for smoke, etc. detection are not present. In these embodiments, the LBSD is still a connected one that may communication with other bulbs (including LBSD), a CMS, etc. Where LBSD is used throughout the description, it should be understood that a non-LBSD may be used for non-detection purposes.

Additionally, one or more sensors 127 (e.g., temperature, non-particulate detecting light, and/or motion) are provided in some embodiments.

Figure 3:
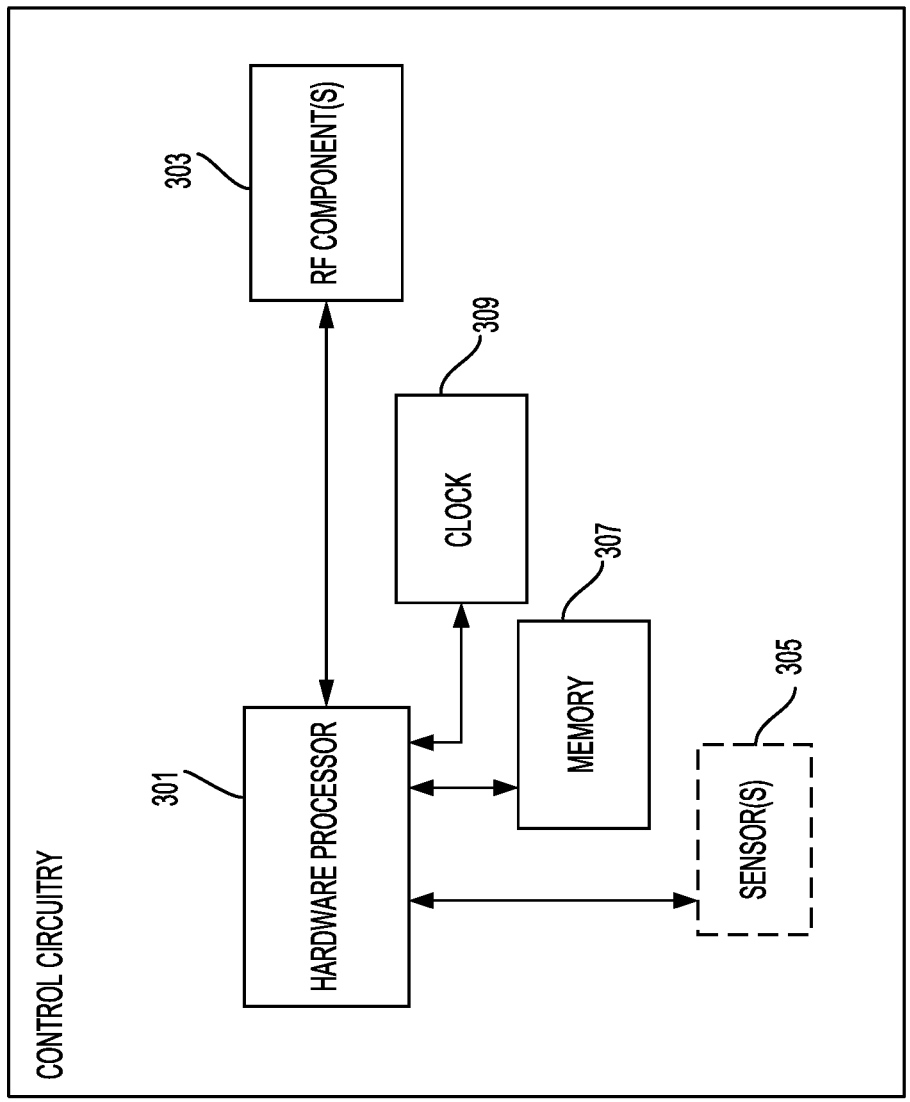
FIG. 3 illustrates an embodiment of a wireless control circuit.

FIG. 3 illustrates an embodiment of control circuitry for a LBSD. As illustrated, the controller includes a hardware processor (such as a microcontroller or central processing unit (CPU)) 301 to process software in the form of executable instructions.

Memory 307 stores software to be executed by the processor 301, one or more lighting profiles, particulate information, network information, and, in some embodiments, a clock routine.

Communication components 303 include one or more of: powerline communication circuitry, analog RF circuitry, and/or base-band circuitry to receive and transmit data (typically as packets). The wireless circuits are coupled to one or more antennas such as PCB trace antennas. In some embodiments, the RF components support Bluetooth Low Energy (BLE).

In some embodiments, the communication components 303 include a separate processor to process incoming and outgoing data. For example, the processor packetizes data for outgoing transmission and de-packetizes incoming packets to extract data to pass to the processor 301. However, in some embodiments, this functionality is provided by processor 301.

In some embodiments, the control circuitry includes at least one sensor 305. For example, an included temperature sensor detects temperature of the LBSD itself (the LED array(s) of the LBSD 115) and/or of a surrounding environment. Sensors allow for diagnostics to detect non-operating LBSD LEDs based on temperature and light levels sensed.

In some embodiments, the control circuitry includes a real-time clock (RTC) 309 to track current time. For example, a RTC circuit tracks time for the wireless controller.

Figure 4:
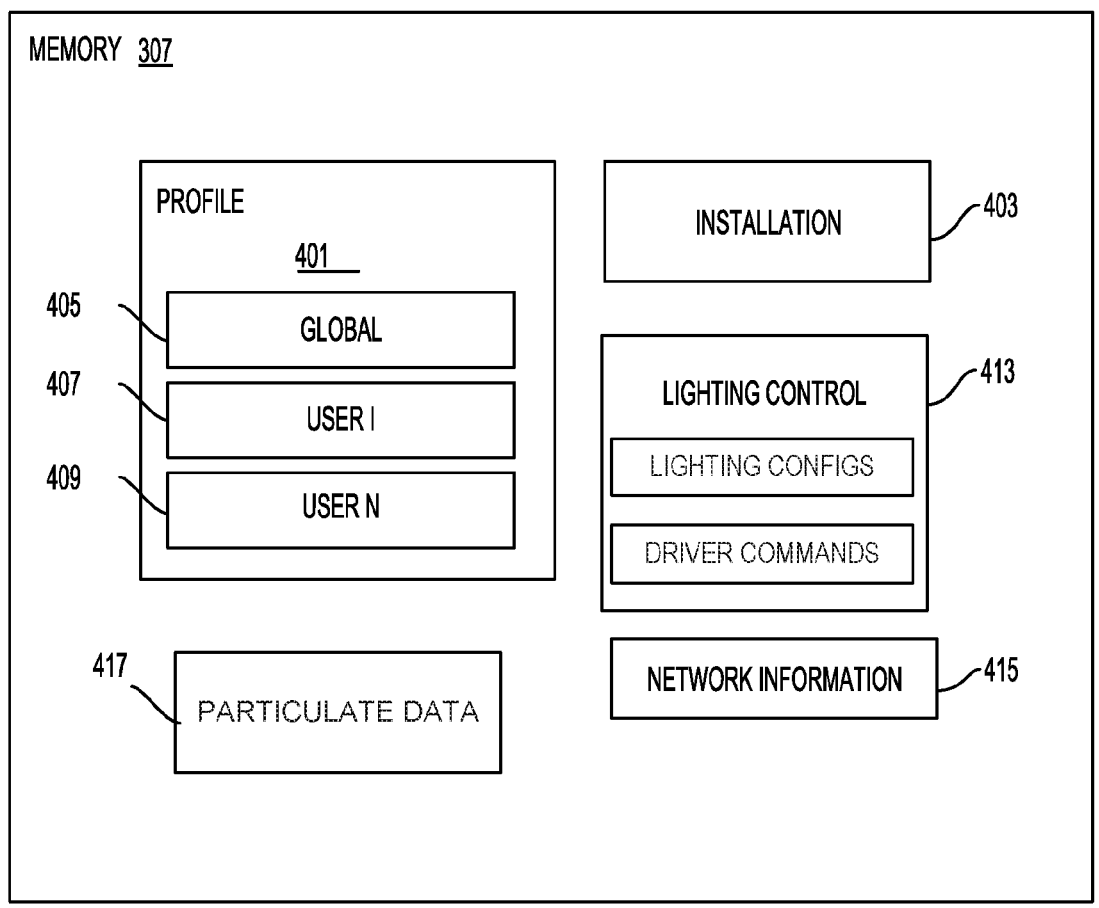
FIG. 4 illustrates an embodiment of memory of a wireless controller.

FIG. 4 illustrates an embodiment of memory to store LBSD and smoke detector related data. In many embodiments, the memory is a part of a system on a chip (SOC) of a controller. However, in other embodiments, the memory is external to a wireless controller SOC. The memory 307 may be non-volatile (such as flash, etc.), volatile, or a combination thereof. One or more profiles 401 are stored in memory. These profiles 401 (such as a global profile 405 and user profiles 407-409) are used by lighting control software 413 to handle received RF commands and provide LED driver commands to the LED controller. In some embodiments, a LED driver command is a part of a lighting configuration. Lighting configurations provide one or more LED driving commands (examples of which have been previously detailed) to be given to one or more LED driver circuits of the LBSD based upon a state of a set of one or conditions. An example of a lighting configuration is as follows, for user 1, under the condition of the time being from 8 AM-9 AM, increase the intensity of the LEDs of the LBSD. Another example of a lighting configuration is if a neighboring LBSD is outputting too much light (as determined by the bulb's sensor), then reduce the intensity of the LEDs 115 of the LBSD, else leave the LEDs 115 as they are currently set. In some embodiments, a LBSD comes with preset lighting configurations. In some embodiments, light configurations are user or administrator configurable.

The lighting control software 413 is also used to update profiles 401 and network information 415 (which stores information about what group the LBSD belongs to), and respond to requests for the stored information. Lighting control software 413 may also include one or more lighting configurations.

The memory also stores particulate information 417 to be used to attempt to determine what type of particulate has been detected by a sensor of the LBSD. The identified particulate may be sent out as a part of an alert by the LBSD.

Installation software 403 provides a routine to handle installation/configuration of the bulb. Memory also stores a device identifier for the bulb. Memory 307 may also store a listing of capabilities of the LBSD (what dimming it supports, etc.). FIG. 5 illustrates an embodiment of profiles used by a wireless controller software. A LBSD may have one to many profiles 401. In some embodiments, by default, with no configuration, the LBSD is to operate as normal LBSD without any capability of being wirelessly controlled. In other embodiments, a global profile allows any wireless user that communicates with the LBSD to use proximity to control the bulb. For example, when the user's device communicates with the bulb, the LBSD turns on for a set duration.

Each non-default profile includes a name 501, at least one wireless identifier 503 associated with the profile, allowed commands 505, a relative priority 507, and a duration counter 509. Names 501 indicate who the profile is associated with, such as a particular user or group. Wireless IDs 503 are IDs provided to the LBSD associated with one or more user devices. For example, media access control (MAC) addresses of cell phones that have BLE connectivity to talk to the bulb.

Allowed commands 505 may include, but are not limited to, commands for on/off, dim (0-10 or DALI), color adjustment, and timer; and proximity based (turn on/off) commands.

In some embodiments, profiles are given a relative priority 507 such that if conflicting profiles could be applied (for example, two users are communicating with the bulb) the profile given higher priority (shown with a lower number in the figure) will be used.

Finally, a duration (counter) 509 may be set for each profile in some embodiments. For example, after 15 minutes the wireless controller waits for contact, or attempts to make contact, with the profile device that provided a command (either explicit or by proximity). In some embodiments, when no contact is made, a default command is taken (such as turn off the bulb). When contact is made, the duration (counter) is reset.

In some embodiments, a profile contains a link to one or more lighting configurations 511, or lighting configurations themselves.

Figure 6:
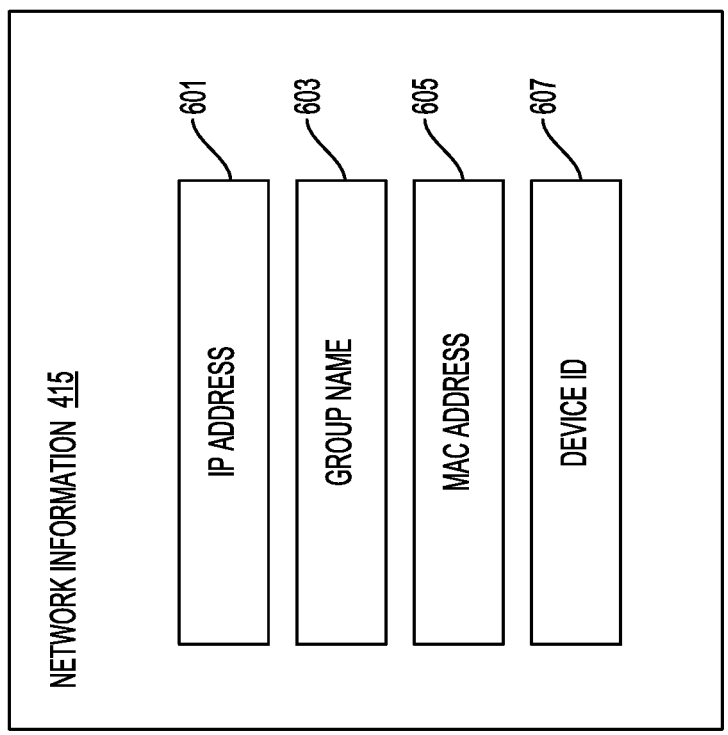
FIG. 6 illustrates an embodiment of network used by a wireless controller software.

FIG. 6 illustrates an embodiment of network used by a wireless controller software. The network information 415 includes one or more of an IP address 601 of the bulb, a group name 603 that the LBSD belongs to, a MAC address 605 of the bulb, and a device ID 607 of the bulb. The network information may also include a log of device connectivity (occupancy) with other devices (e.g., what device connected, for how long, and when the connection took place).

Figure 7:
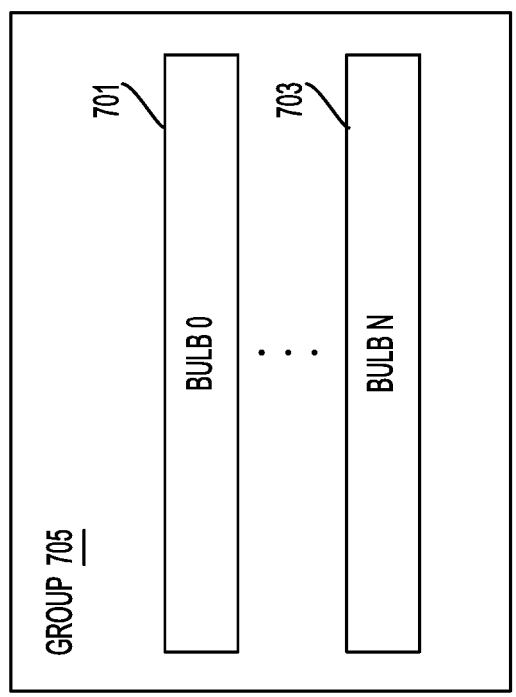
FIG. 7 illustrates a collection of bulbs into a group.

FIG. 7 illustrates a collection of bulbs into a group. In the group 705 there are bulbs 701-703. A grouping is sometimes called a piconet. Typically, the group includes a master LBSD and slave bulbs which follow the master bulb. In some embodiments, the group of bulbs connect to each other in an ad hoc fashion.

Figure 8:
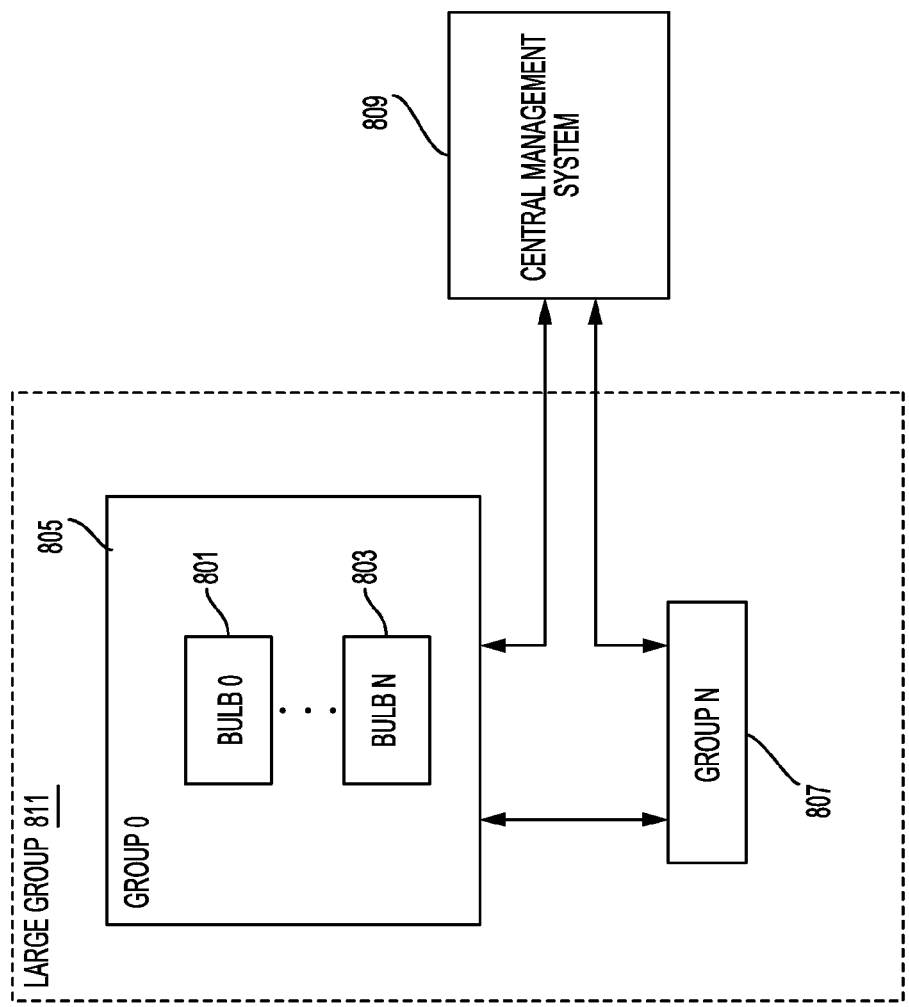
FIG. 8 illustrates a collection of groups of bulbs into a large group.

FIG. 8 illustrates a collection of groups of bulbs into a large group. A first group (bulbs 801-803) and a second group N 807 form a larger group 811 (sometimes called a scatternet). These groups are interconnected using one of the bulbs from the second group. The bulbs participating in both groups 805, 807 relays data between members of groups.

The larger group 811 (or each group individually) may communicate with a central management system (CMS) 809. The CMS 809 may provide the operating properties to the bulbs (either directly or via an application on a user device) and may provide all control if needed. Further, each LBSD may provide the CMS 809 with occupancy status information for the space beneath it. It could provide "who" was there, when they were there, how long they were there, etc. for use in security management.

Figure 22:
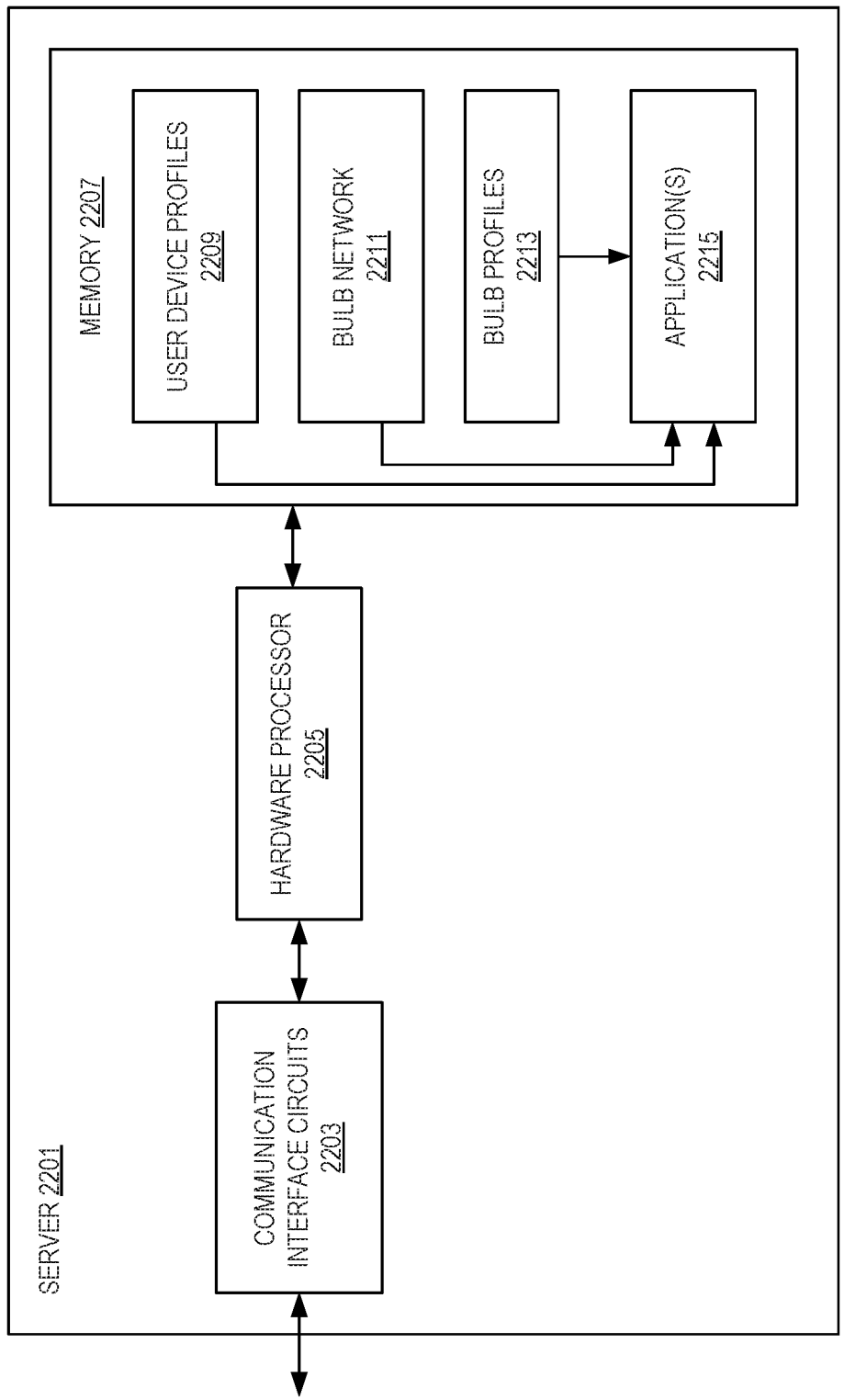
FIG. 22 illustrates an embodiment of a server to communicate with one or more bulbs.

FIG. 22 illustrates an embodiment of a server to communicate with one or more bulbs. For example, the server 2201 is a CMS. In an embodiment, the CMS is a part of an on-demand computing environment.

The server includes communication interface circuitry 2203 to communicate with one or more bulbs. Exemplary communication interfaces include, but are not limited to, Bluetooth® and Bluetooth® Low Energy (BLE) (such as that maintained by Institute of Electrical and Electronics Engineers (IEEE) standard 802.15.1 and the Bluetooth SIG); Wi-Fi (IEEE 802.11); INSTEON; Infrared Data Association (IrDA); wireless USB; z-wave; Radio Frequency for Consumer Electronics (RF4CE); ZigBee (IEEE 802.15.4 based); powerline communication (PLC); Ethernet; USB; etc.

The server 2201 includes a hardware processor 2205 to execution programs/applications/routines 2215 stored in memory 2207. Exemplary applications are detailed later. Memory 2207 may also store user device profiles (such a default profile and individual profiles) 2209, LBSD network information (location, type, sub-network, etc.) 2211, and LBSD profiles (configured LBSD information) 2213. The applications 2215 may use one or more of these during execution.

Figure 9:
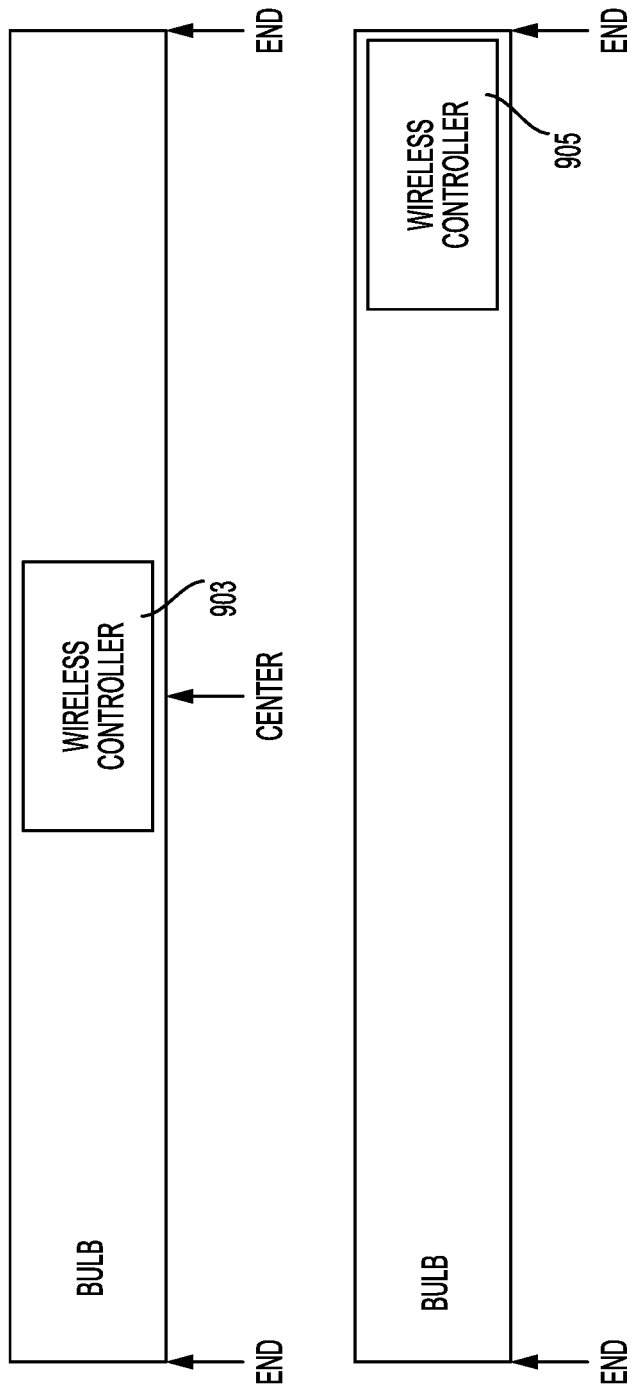
FIG. 9 illustrates exemplary embodiments placement of wireless controllers in bulbs.

FIG. 9 illustrates exemplary embodiments placement of wireless controllers in bulbs. The top embodiment shows a wireless controller 903 close to the center of the bulb. The bottom embodiment shows a wireless controller 905 close to an end of the bulb. The placement of the wireless controller can facilitate the formation of piconets and scatternets guided by signal strength information.

Figure 10:
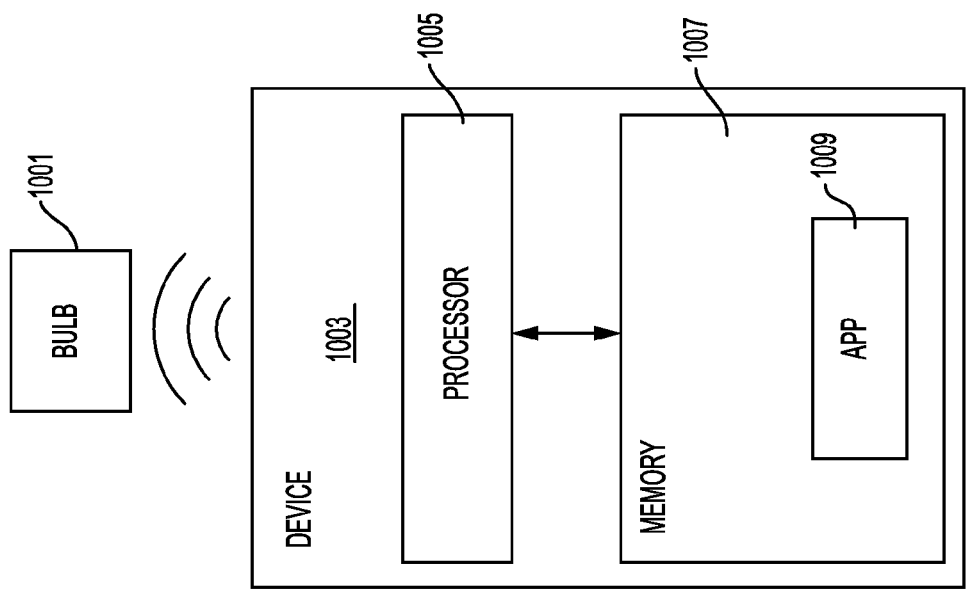
FIG. 10 illustrates an embodiment of a device communicating with a bulb.

FIG. 10 illustrates an embodiment of a device communicating with a bulb. The device 1003 (such as a Bluetooth enabled phone, computer, etc.) includes a processor 1005 and memory 1007 to store an application 1009 used to communicate with the LBSD 1001 via RF components of the device 1003. The application 1009 allows a user to control the LBSD 1001 according to a profile of the LBSD 1001. The application 1009 may also include a configuration routine to configure aspects of the LBSD (such as adding the LBSD to a group, configuring a profile, etc.).

Figure 11:
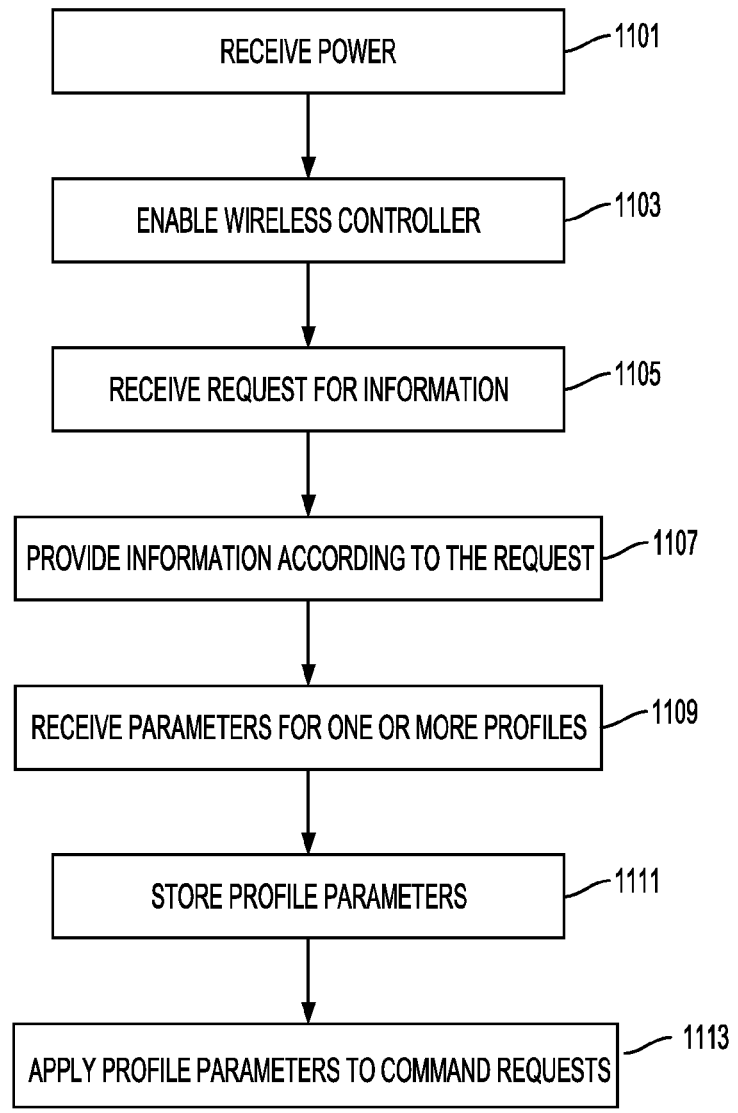
FIG. 11 illustrates an embodiment of a method performed by a bulb.

FIG. 11 illustrates an embodiment of a method performed by a bulb. At 1101, the LBSD receives power. This allows the different components to power on including the wireless controller which is powered up and enabled at 1103. In some embodiments, the wireless controller is powered by a source internal to the LBSD and does not need external power to turn on.

The wireless controller receives a request for information at 1105. For example, an external device (such as a Bluetooth enabled smartphone, tablet, or computer) transmits a request that is received by RF components of the wireless controller. This request for information typically asks for the device ID of the LBSD as stored by the wireless controller. The request may also ask for any profiles stored by the wireless controller and/or the capabilities of the LBSD (what dimming it supports, etc.).

The wireless controller provides the information according to the request at 1107. For example, the wireless controller provides its device ID.

At 1109, the wireless controller receives configuration parameters for one or more profiles. For example, an external device (such as a Bluetooth enabled smartphone, tablet, or computer) transmits parameters for a profile that is received by RF components of the wireless controller.

The received profile parameters are stored into memory of the wireless controller at 1111.

At some point later in time, the wireless controller applies stored profile parameters to a command request and directs the LED controller to perform a command (turn off/on, dim, etc.) at 1113.

Note that the above may be repeated per LBSD in a group or large group, or the LBSD in communication with the external device may pass the information, commands, etc. to the other bulbs in the group or large group. Additionally, in some embodiments, when a new LBSD is added to fixture it is made a slave and inherits profiles, etc. from the master bulb.

Figure 12:
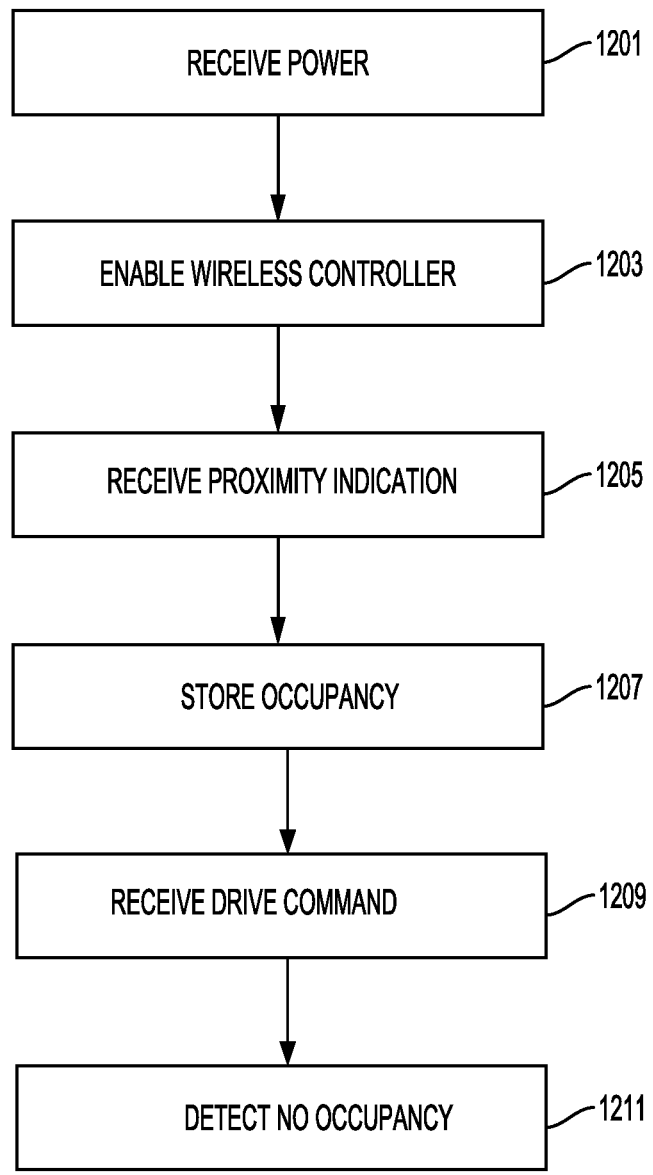
FIG. 12 illustrates an embodiment of a method performed by a bulb.

FIG. 12 illustrates an embodiment of a method performed by a LBSD dealing with proximity. At 1201, the LBSD receives power. This allows the different components to power on including the wireless controller which is powered up and enabled at 1203. In some embodiments, the wireless controller is powered by a source internal to the LBSD and does not need external power to turn on.

The wireless controller receives a proximity indication at 1205. For example, an external device (such as a Bluetooth enabled smartphone, tablet, or computer) communicates with RF components of the wireless controller to alert the wireless controller of its presence. In some embodiments, one or more defined packets are received from the external device to indicate a desire to communicate with the wireless controller.

In some embodiments, at 1207, the wireless controller stores occupancy information related to the proximity indication.

At 1209, a LED drive command is received, and, if allowed, the LED drive command is provided to the LED controller to be performed. For example, an LED drive command of dim, turn off/on, color adjusting command, etc. is received and provided to the LED controller. When a higher prioritized profile does not allow for the command (or the command is priority pre-empted), it is not provided to the LED controller. The prioritized profile is a profile that is currently deemed to have the highest priority. Note, the LED drive command could simply be proximity based such that when the prioritized profile allows for proximity based commands (e.g., turn on/off) that command is performed without any explicit LED drive command being received.

At some point later in time, the wireless controller detects that there is no device in proximity for a set duration at 1211. For example, after 15 minutes the wireless controller attempts to make contact with the profile device that provided a command (either explicit or by proximity). When no contact is made, a default command is taken (such as turn off the bulb). Note that the above may be repeated per LBSD in a group or large group, or the LBSD in communication with the external device may pass the information, commands, etc. to the other bulbs in the group or large group.

Figure 13:
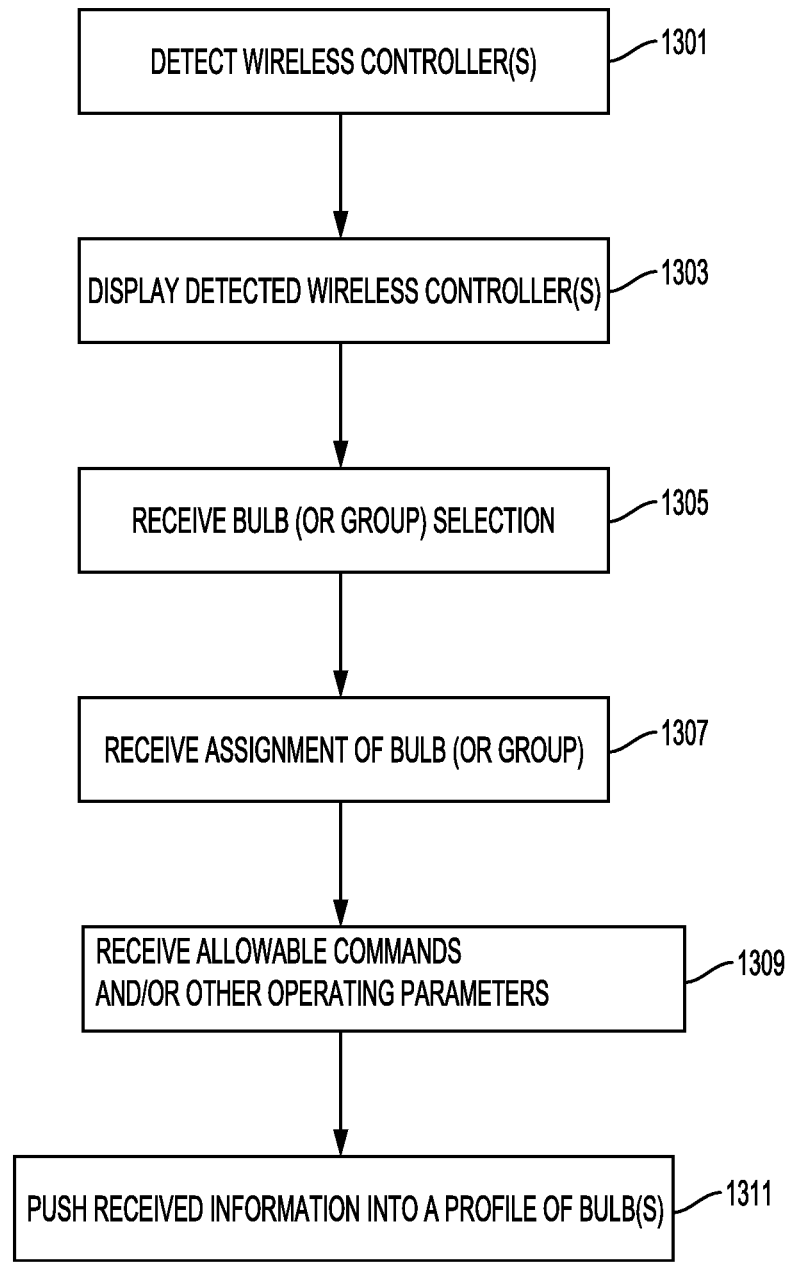
FIG. 13 illustrates an embodiment of a method performed on a device external to the bulb.

FIG. 13 illustrates an embodiment of a method performed on a device external to the bulb. For example, embodiments of this method are performed on an application of a smartphone, tablet, or computer that is enabled to wirelessly communicate with the bulb. Typically, the application is received from a CMS.

At 1301, one or more wireless controllers of bulbs are detected. This detection could be the result of a user initiated scan, or occur automatically without user intervention. Typically, a fixture will have more than one LBSD (for example, four bulbs) that are to be configured as a group.

The detected wireless controllers of bulbs are displayed at 1303. The display order may be done in many different ways including, but not limited to, by LBSD name (device ID), signal strength, etc.

At 1305, a LBSD (or group) selection is received. For example, a user taps on a LBSD in the application to select that LBSD (or group that it belongs to).

In some embodiments, for example during installation of a bulb, at 1307, an assignment of a LBSD (or group) is made. For example, a LBSD is assigned to profile USER 1.

At 1309, allowable commands and/or other profile parameters (e.g., name) are received by the application.

The information received at 1309, is pushed (sent) to the selected LBSD at 1311 to be stored in a profile.

Figure 14:
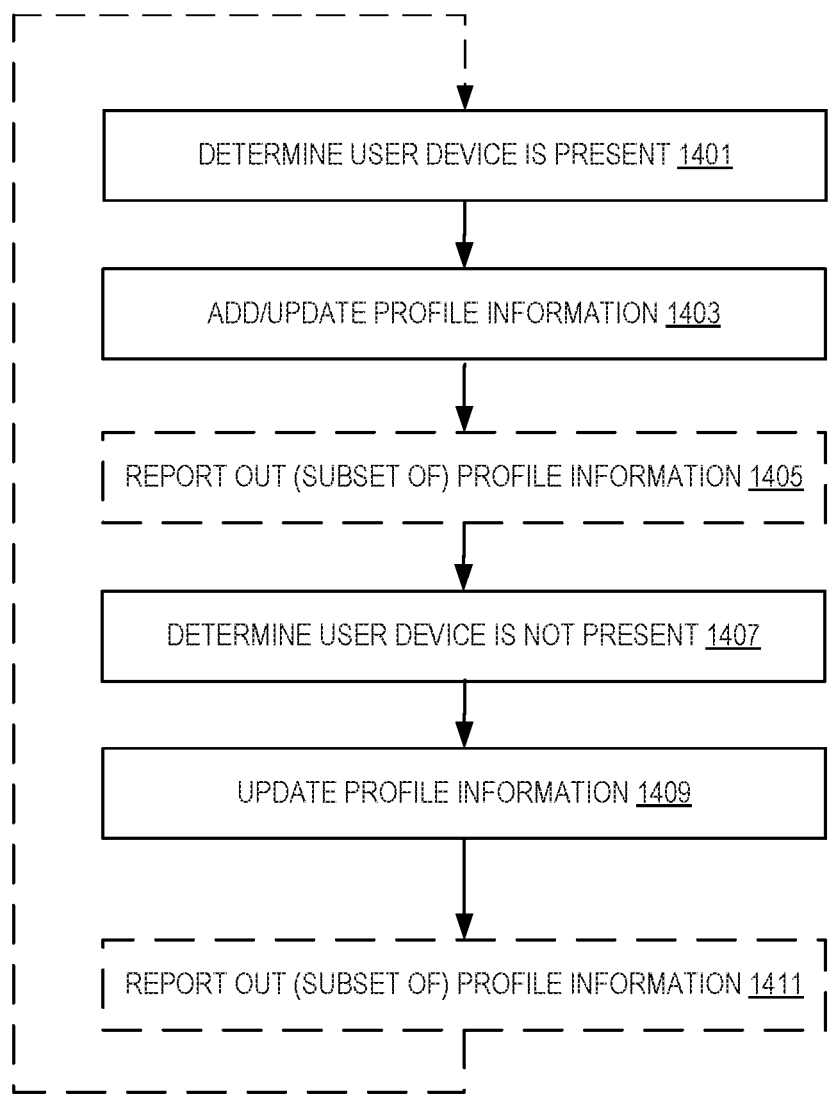
FIG. 14 illustrates an embodiment of a method performed by a LBSD.

FIG. 14 illustrates an embodiment of a method performed by a LBSD. A determination of a user device (e.g., a mobile device) being present is made at 1401. Depending up on the implementation of the LBSD, this detection may be made several different ways. For example, in some embodiments, the LBSD acts as a proximity reporter with a user device that acts as a proximity monitor. The proximity monitor creates connection with the proximity reporter and monitors Radio Signal Strength Information (RSSI). If there is no connection with the proxy monitor, there is no user device present.

Presence information is stored in a profile (for example, in a user profile as detailed previously) at 1403. Exemplary information may include the user device's ID, the time of connection, the duration of the connection, etc. This information may be an update to an existing profile or a new profile creation.

In some embodiments, at least some of the profile information is reported out at 1405. For example, the profile information is sent to a server for storage and/or evaluation. The report out may be automatic or polled depending upon the implementation.

At some point later in time, a determination is made that the user device is not present near the LBSD at 1407. For example, a proximity monitor has not communicated with the proximity reporter for a period of defined time. This time may be stored in the profile as a duration as detailed earlier.

Presence information is stored in a profile (for example, in a user profile as detailed previously) at 1409. Exemplary information may include the user device's ID, the time of connection, the duration of the connection, etc. This information may be an update to an existing profile.

In some embodiments, at least some of the profile information is reported out at 1411. For example, the profile information is sent to a server for storage and/or evaluation. The report out may be automatic or polled depending upon the implementation.

Figure 15:
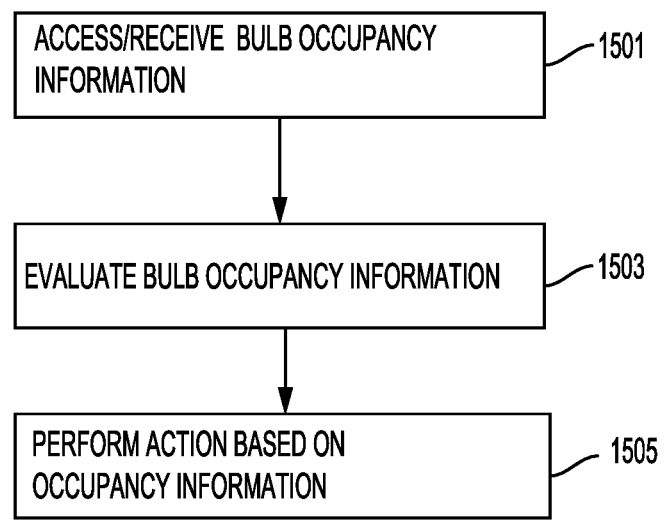
FIG. 15 illustrates an embodiment of using LBSD occupancy information.

The use of presence information allows for many use cases. FIG. 15 illustrates an embodiment of using LBSD occupancy/presence information. Typically, this is performed by an entity other than a bulb, such as a server. At 1501, occupancy/presence information from one or more bulbs is accessed and received by a third party (such as a control management service). For example, "who" was there, when they were there, how long the person was there, unknown user presence, etc. are pulled/pushed as one or more profiles of the LBSD are accessed.

This allows for questions to be answered such as are there users not associated with a profile that were in proximity with the bulb, who was not there that should have been (for example, a user has a profile but should not have been in the room that had the bulb), who was not there that should have been (for example, a user has a profile and should have been in the room that had the LBSD at a certain point in time, but was not), etc.

At 1503, an evaluation of the occupancy/presence information is made to determine an action. There are many different scenarios (examples are detailed herein). For example, the profile information is subject to one or more sets of rules to determine a potential action.

In some embodiments, filters are used to reduce or eliminate redundant information and adjust starting presence and ending presence through time stamps from the first detection of an individual to finding out the individual has left the space. As an example, the earliest someone is detected in a conference room can be obtained by overlay any existing data about that individual with information about an earlier connection indication. An individual is detected leaving with the later connection indication, etc. Collected information can be periodically sent to a CMS or sent on demand by a CMS or hand-held device etc.

At 1505, an action is performed/invoked based at least on the occupancy/presence information. The action may be in the form of a command sent from the server to a LBSD to perform, etc. This action may be lighting based or not. As an example of a lighting action, usage patterns of a user may be used to configure lighting for that user. For example, when an employee returns to work in the evening, or at night, a path can be lit up from his entry point to his desk based on his past patterns of activity as recorded by the bulbs. Another example is when a visitor wants to meet with an employee, after a possible security check, a command causes the lighting to change colors, dim, brighten, or flash, etc. that marks a trail that leads the visitor to the employee's desk. Another example is a parking lot or structure/garage where individual lights could monitor for "presence" or "absence." The lights would know over specific time frames similar to the previous use case (for conference rooms and auditoriums etc.), but also track a user movement through the parking structure and preference for parking spots. This information can be globally correlated across all the lights would give usage peaks and valleys, travel routes through the parking structure, patterns of parking spot usage, popular spots and idle spots, and lead to ideas to optimize traffic flows within the structure. Patterns to all parking spots by all employees (or shoppers) would be learned over time and as each car enters the parking structure lights could lead them to the optimal open space for them (the open space closest to where they usually park). A final example is lighting a path during a fire to an exit to lead a person out of danger. These scenarios are programmed either in the bulbs themselves (stored in memory) or at a server to be pushed to the bulbs that are affected. In addition, the collected information about user triggered lighting activity and paths can be mined further using analysis techniques such as big data analysis.

Non-lighting examples are numerous. For example, HVAC can be controlled based on the knowledge of both occupancy and number of people present in a space at any time. For example, a security action such as flashing lights over an unauthorized person (or following that person) may be taken based upon occupancy. Presence information may also be used as an alert that there is a potential health or security issue. If user device connects with a LBSD for an extended period of time or at an unusual time that is considered abnormal that may indicate a security or health issue. For example, someone at his desk very late at night that has not moved may trigger a flashing overhead light as a guide for emergency medical services (EMS), or the CMS to send a message (e.g., short messaging service, email, phone call, etc.) to the individual or building management, and/or initiate a 911 call, etc.

Figure 16:
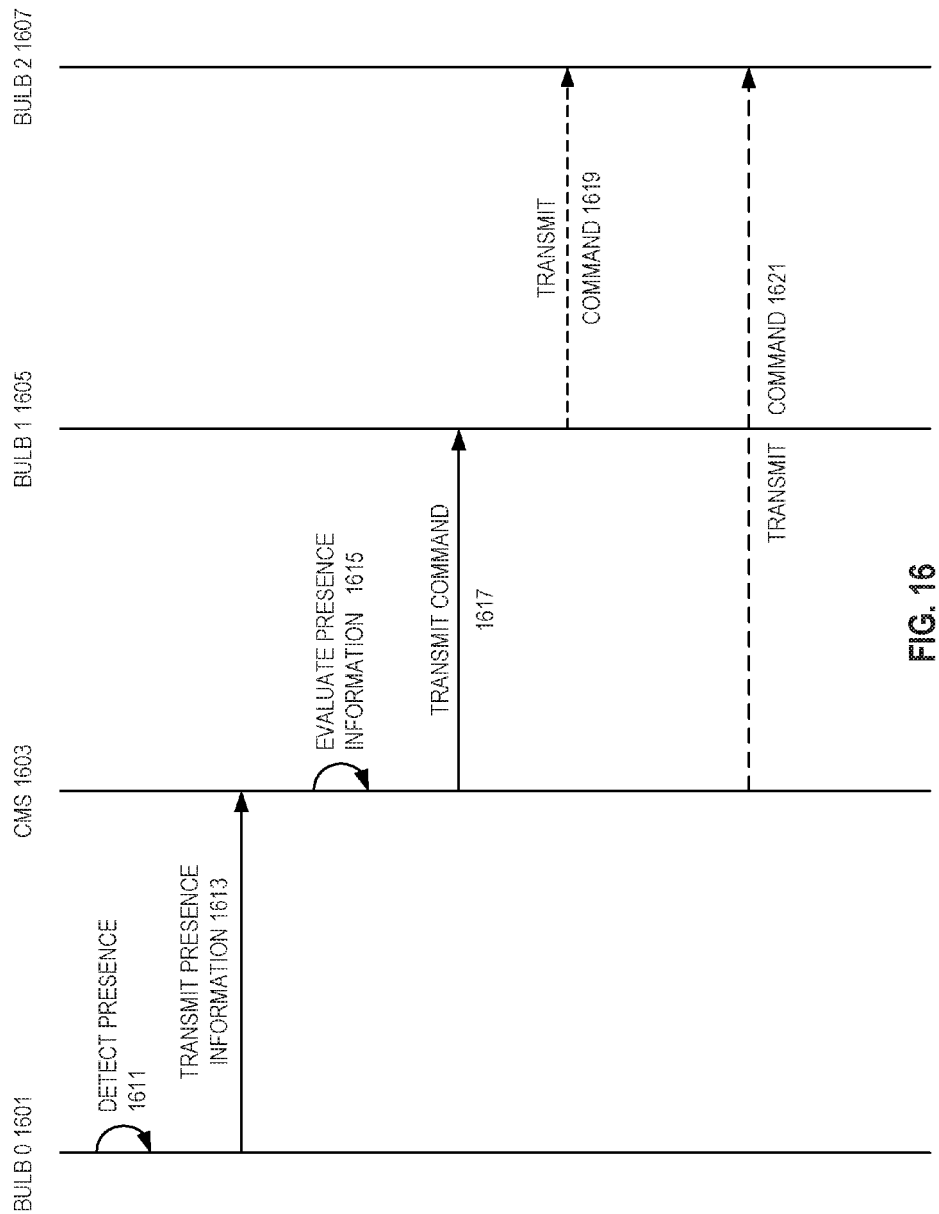
FIG. 16 illustrates an embodiment of flow involving bulbs and a CMS.

FIG. 16 illustrates an embodiment of flow involving bulbs and a CMS. A first LBSD (bulb 0) 1601 detects a presence of a device (as detailed earlier) at 1611. The LBSD transmits information about the presence detection at 1613 to a CMS 1603. This information typically involves one or more data points of a profile as detailed earlier.

The CMS 1603 evaluates the received information at 1615 as detailed earlier. The CMS 1603 then sends a command to at least one LBSD (bulb 1 1605) at 1617. For example, a command to turn on the LBSD is made.

In some embodiments, the receiving LBSD (bulb 1 1605) transmits a command to another LBSD (bulb 2 1607) at 1619. This could be the same command or a different command. For example, LBSD 1 1605 may transmit a command to LBSD 2 1607 to execute at a certain point in time (e.g., tracking a user's path).

In some embodiments, the CMS 1603 transmits a command to another LBSD (bulb 2 1607) at 1621. This could be the same command or a different command. For example, CMS 1603 may transmit a command to LBSD 2 1607 to execute at a certain point in time (e.g., tracking a user's path).

Figure 17:
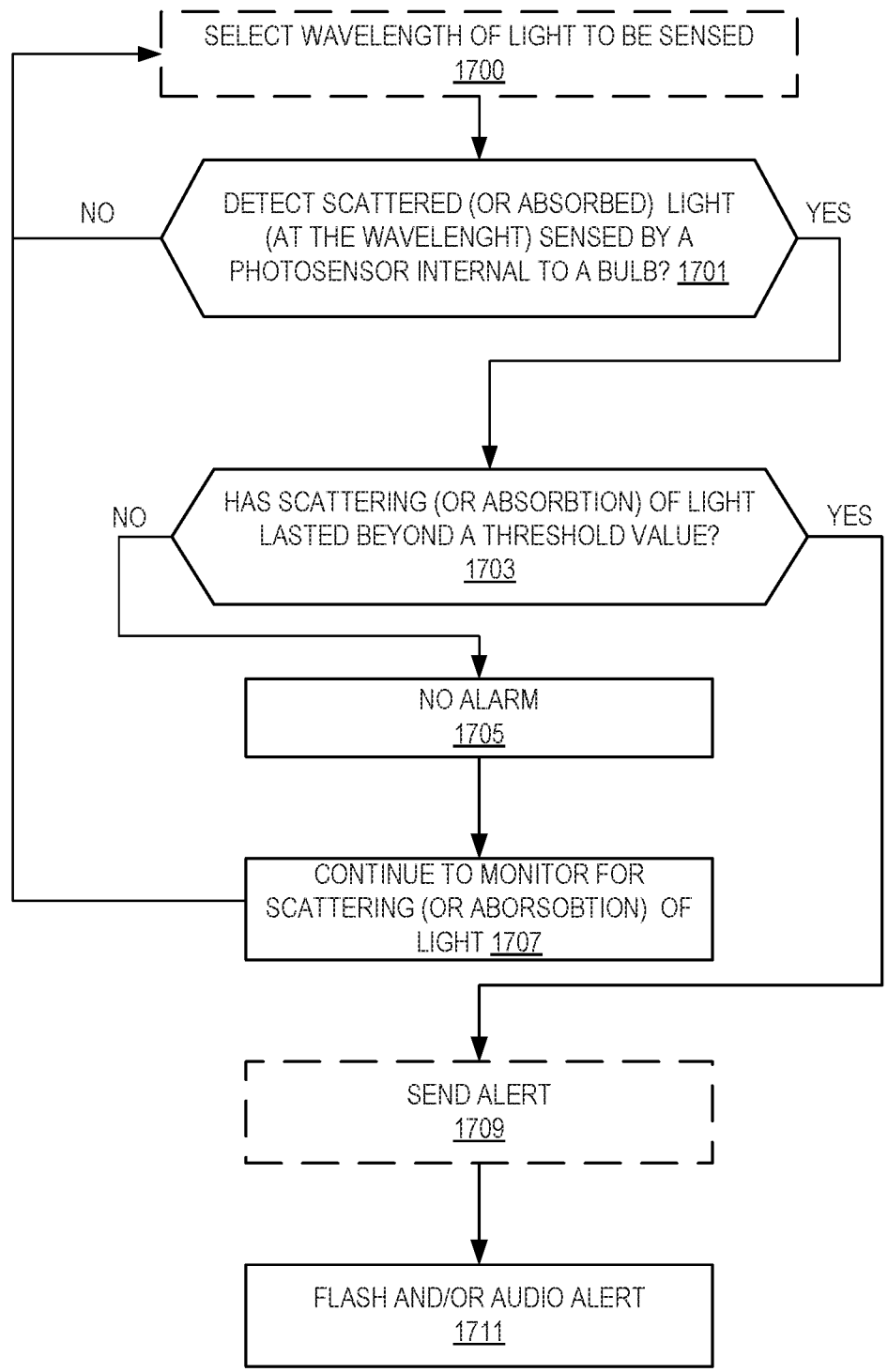
FIG. 17 illustrates an embodiment of a method.

FIG. 17 illustrates an embodiment of a method. Typically, embodiments of this method are performed by a LBSD as detailed herein. In some embodiments, at 1700, a wavelength of light to be generated and sensed is selected. For example, a particular LED frequency (red, blue, green, IR, UV, etc.) is selected to test for gas or a particulate. The test can be done using a detection of reduced light, scattered light patterns, or the detection of absorbed wavelengths.

At 1701, a determination of, scattered or absorbed light is sensed by a sensor internal to the LBSD at the wavelength of light selected is made. In most embodiments, an LED inside of the LBSD provides a pulse of light (visible) into a coupled baffle that has an opening to allow particulates in, from outside of the bulb. The light that is scattered within the baffle is what is sensed. In the IR case, an amount of absorption of light in a chamber is what is sensed or light can be directed through a prism and wavelength absorption can be detected. The scattering (or absorption) of light wavelengths may mean that there is gas or particulate in the air (such as particulate from fire or chemicals). The detection of scattered (or absorbed) light is sent from a sensor to a controller within the LBSD. Note that the LED(s) coupled to the baffle(s) and/or chamber is not deactivated when the LEDs that provide external light from the LBSD are not active. In embodiments not using a selection, the wavelength is set by the LED(s) included in the LBSD as standard. If there is no scattering (or absorption) detected, in some embodiments, a different wavelength (e.g., a different color LED) is selected at 1700.

When scattered (or absorbed) light has been detected, a determination of if the scattering (or absorption) of light has lasted beyond a threshold value is made at 1703. This determination is made by the controller. Typically, the photosensor will continue to send indications of scattered (or absorbed) light in line with the pulse output by the LED coupled to the baffle (or chamber). The threshold value is stored in memory of the LBSD.

When the scattering (or absorption) of light has not lasted beyond the threshold value, then no alarm is triggered at 1705 and the LBSD continues to monitor for scattering (or absorption) of light at 1707.

In some embodiments, when the scattering (or absorption) of light has lasted beyond the threshold value, an alert is sent at 1709. This alert may be sent to a CMS, other LBSD, users associated with the LBSD, etc. The alert may be sent wirelessly from the LBSD, or over a physical connection such as over PLC.

At 1711, the LBSD flashes and/or emits an audio alert.

Figure 18:
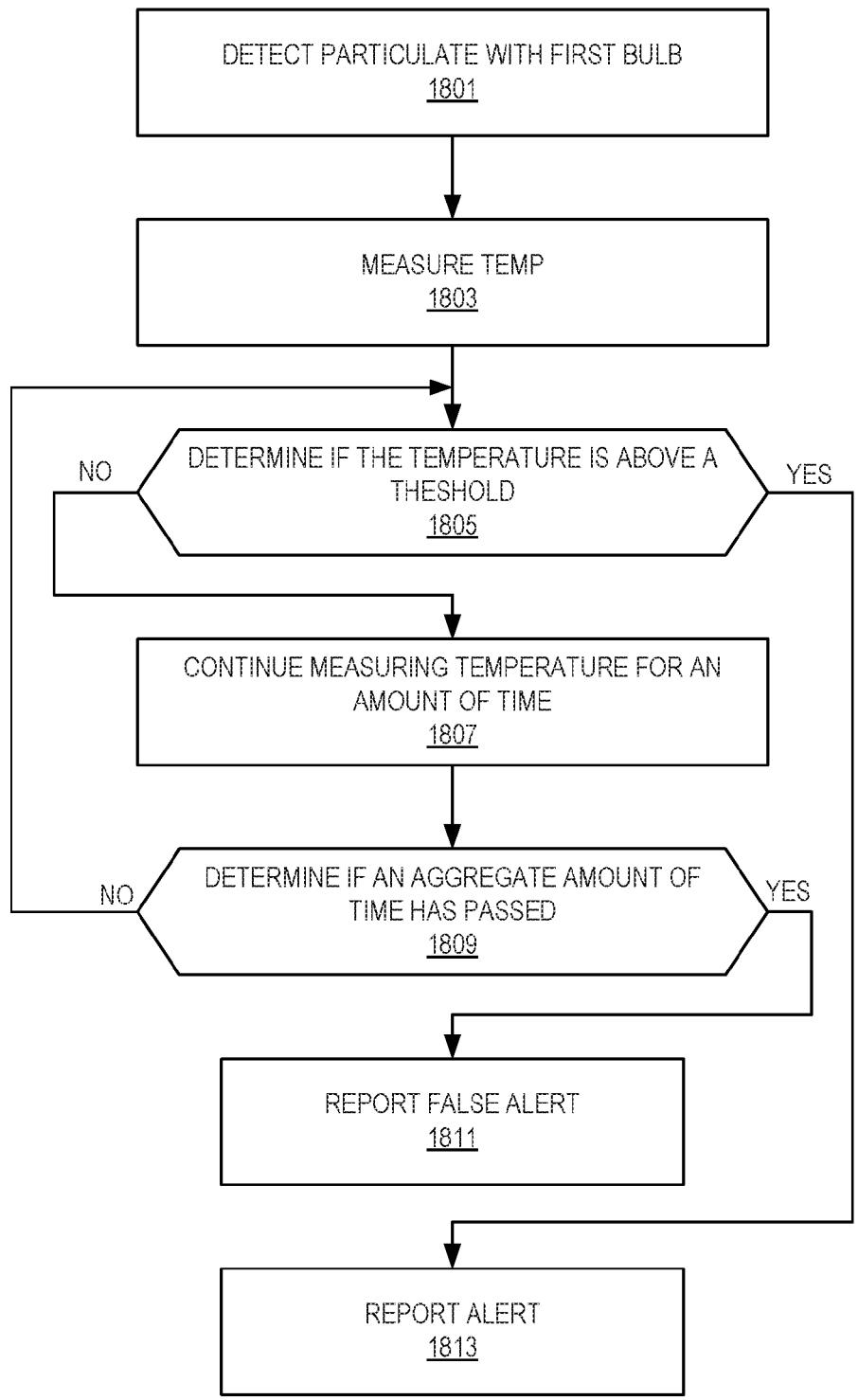
FIG. 18 illustrates an embodiment of a method.

FIG. 18 illustrates an embodiment of a method. Typically, embodiments of this method are performed by a LBSD as detailed herein. At 1801, scattered (or absorbed) light is sensed by a sensor internal to the LBSD (particulate is detected). In most embodiments, an LED inside of the LBSD provides a pulse of light (visible, UV or IR) into a coupled baffle that has an opening to allow particulate in from outside of the bulb. The light that is scattered within the baffle is what is sensed. The scattering of light may mean that there is particulate in the air (such as particulate from fire or chemicals). In the IR case, an amount of absorption of light in a chamber is what is sensed. The scattering or absorbed wavelengths of light may mean that there is gas or particulate in the air (such as particulate from fire or chemicals). The detection of scattered (or absorbed) light is sent from the sensor to a controller within the LBSD. Note that the LED(s) coupled to the baffle(s) and/or chamber is not deactivated when the LEDs that provide external light from the LBSD are not active.

A measurement of temperature at the LBSD is made at 1803. For example, a temperature sensor in the LBSD measures the temperature of LBSD in relation to an expected temperature. This reading is sent to a controller of the LBSD.

A determination of if the temperature has lasted beyond a threshold value is made at 1805. This determination is made by the controller. Typically, the temperature sensor will continue to a reading to the controller.

When the temperature is not beyond the threshold value, then no alarm is triggered at 1807 and a temperature measurement is continued for a set amount of time.

A determination of if the temperature an aggregate amount of time has passed has lasted beyond a threshold value is made at 1809. If not, then another determination of if the temperature is above a threshold is made at 1805. At 1811, a false alert is reported. For example, the LBSD sends a false alert notice to a CMS.

In some embodiments, when the temperature is above the threshold at any point during the set amount of time, then an alert is reported by the LBSD at 1813. For example, the LBSD may send a message to a user device coupled to the LBSD and/or to a management device (such as a server) at 1813. The LBSD may also flash, emit a sound, etc.

Note that one or more aspects of the flow may not be performed depending upon the embodiment. For example, in some embodiments, upon a detection of particulate in the air an alert is reported at 1813 without doing a temperature measurement. In some embodiments, the alert includes an indication of what the particulate is.

Figure 19A:
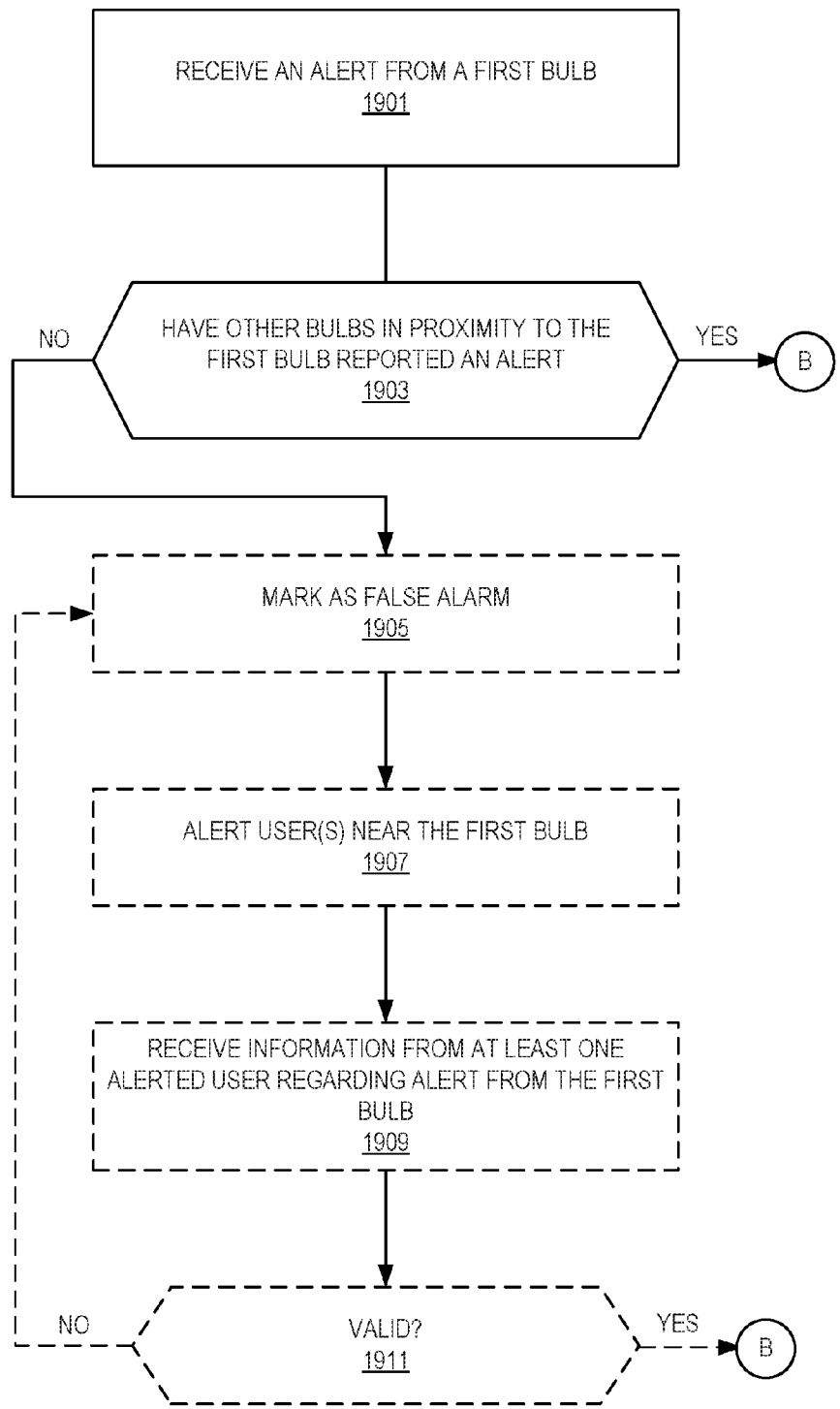
FIGS. 19(A)-(B) illustrate an embodiment of a method.
Figure 19B:
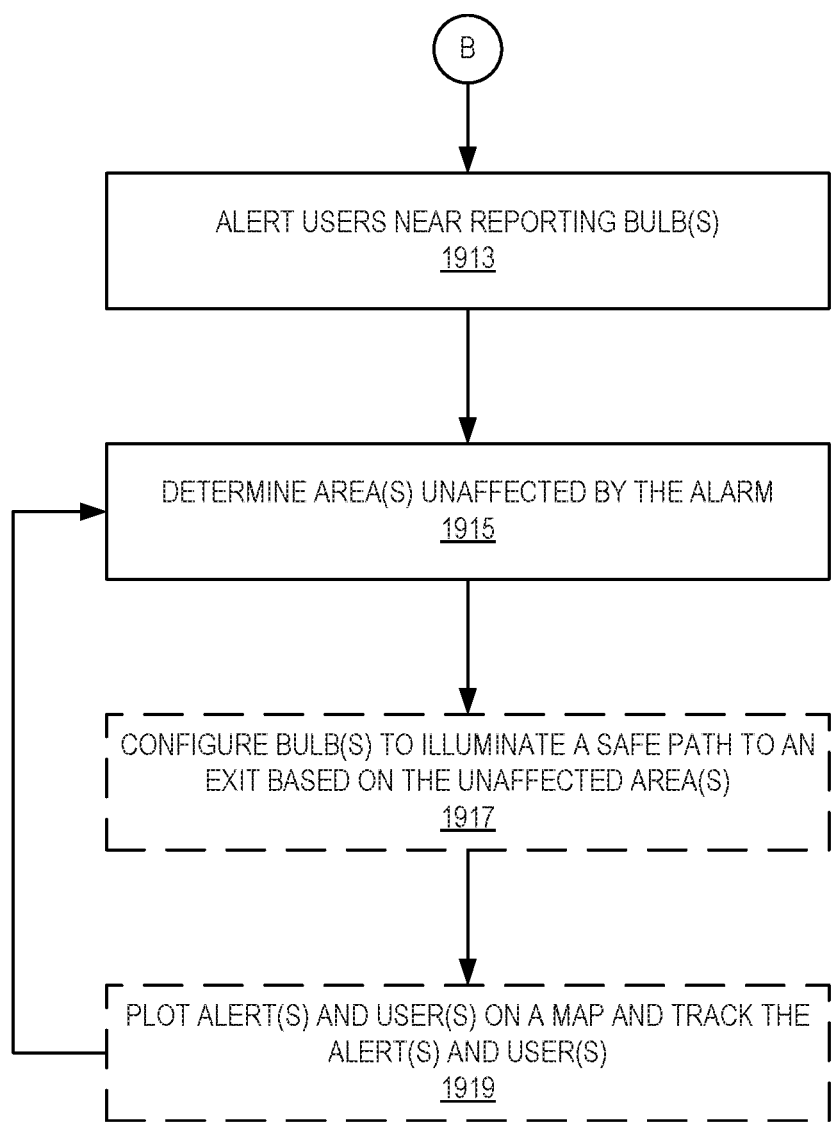
Figure 21:
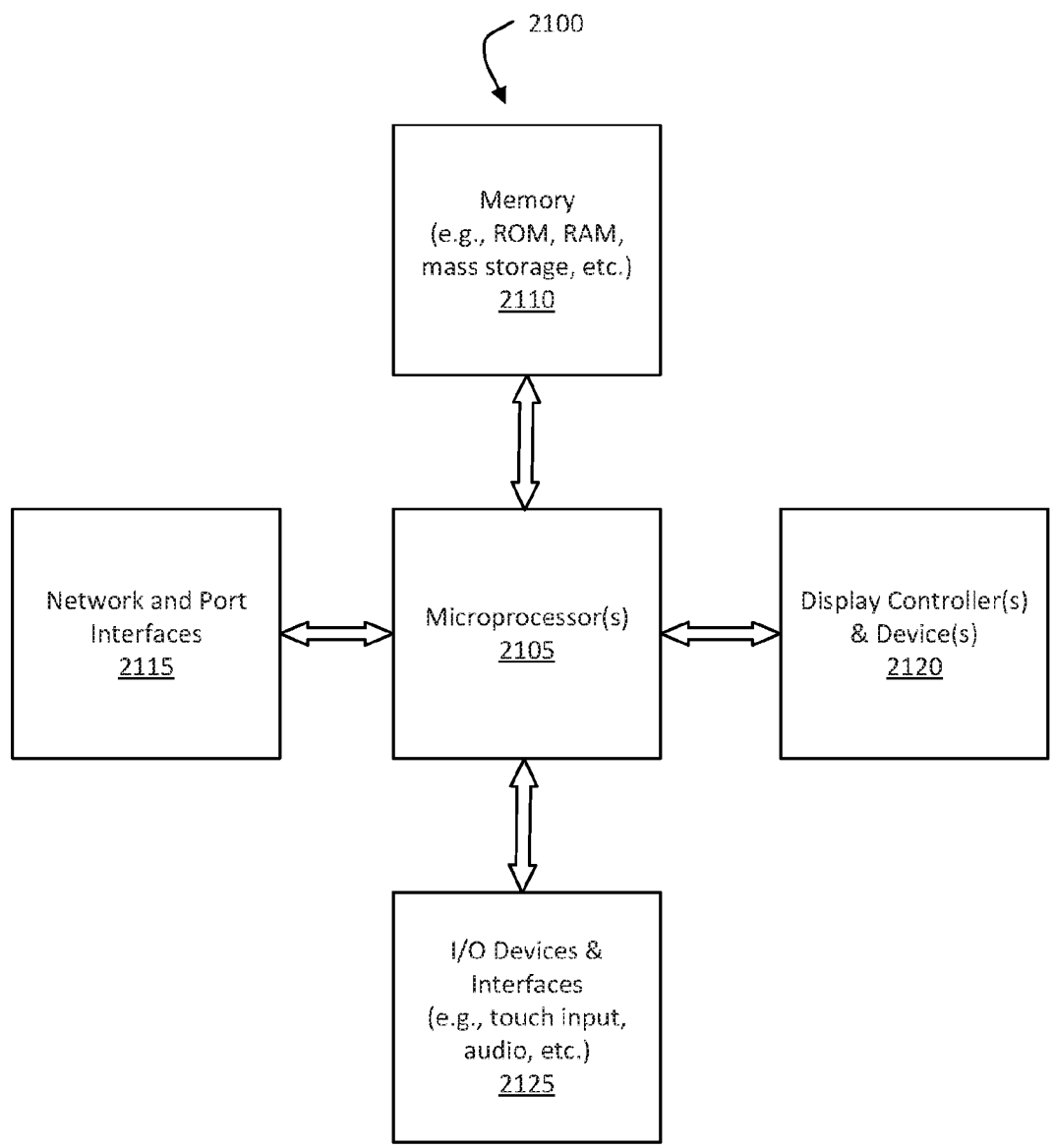
FIG. 21 illustrates, in block diagram form, an exemplary processing system to perform event planning and events as detailed herein.

FIGS. 19(A)-(B) illustrate an embodiment of a method. Typically, embodiments of this method are performed by a LBSD, or by a CMS, as software executed by a hardware processor. At 1901, an alert is received from a first LBSD. For example, an alert is received wirelessly or via a physical connection.

A determination of if other LBSDs within proximity to the first LBSD have reported an alert is made at 1903. For example, has the CMS received an alert from a LBSD within the same fixture as the first LBSD? Or, has the CMS received an alert from an LBSD within a few feet of the first LBSD?

If not, in some embodiments, the alert received from the first LBSD is treated as a false alarm at 1905 and the LBSD is marked as potentially needing servicing.

In some embodiments, users near the first LBSD are alerted of a potential issue at 1907. The alerted users may provide a confirmation of a false alarm (for example, via a SMS or through an application). At 1909, information from at least one alerted user regarding the alert from the first LBSD is received.

A determination of if the alert was valid based upon user input is made at 1911. When the alert is not valid, then it is marked as false at 1905. When the alert is valid, users near the reporting LBSD(s) are alerted at 1913. These users may be alerted via one or more ways: a message to a mobile device, an electronic communication to a workstation, a flashing of LBSDs near the users, an audible alert, etc. These alerts are typically pushed from a CMS to these devices.

A determination of areas unaffected by the alarm is made at 1915. For example, the CMS uses reports from LBSDs and/or users to determine which areas are free of reporting LBSDs.

In some embodiments, LBSDs or other bulbs not affected, are configured to illuminate a safe path to an exit based upon the determination at 1917. For example, the CMS configures bulbs in a path to increase their brightness and/or flash as a rate different than the alerting LBSDs. In some embodiments, bulbs that are off of the safe path are dimmed such that the safe path is more distinctive.

In some embodiments, at 1919, the received alerts (e.g., fires, etc.) are plotted on a map along with users that are in communication with bulbs in the premises. The alerts and users are tracked and use to update the area(s) affected and users in potential danger. In some embodiment, this map is provided to emergency personnel to aid in rescuing.

FIG. 20 illustrates an embodiment of a method. Typically, embodiments of this method are performed by one or more LBSDs or an LBSD and a CMS as detailed herein. At 2001, a problem is detected by a first LBSD. For example, scattered light is sensed by a photosensor internal to the LBSD.

The first LBSD is flashed at a first rate at 2003. This rate is typically store in memory of the LBSD.

An indication of a problem is transmitted from the first LBSD to a third party at 2005. In some embodiments, the first LBSD transmits an indication of a problem to another LBSD and/or a CMS either wirelessly or via a physical connection.

A receiving device (other LBSD or CMS) receives the indication from the first LBSD at 2007. The receiving device transmits at least one command to at least one other LBSD (LBSD or other bulb) near the first LBSD to perform an action at 2009. For example, the command may tell the at least one other LBSD to flash at a different rate than the alerting bulb, dim, brighten, etc.

Data processing system 2100 includes memory 2110, which is coupled to microprocessor(s) 2105. Memory 2110 may be used for storing data, metadata, and programs for execution by the microprocessor(s) 2105 including embodiments of the methods detailed above. For example, memory 2110 may include one or more of the profiles described herein. Memory 2110 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 2110 may be internal or distributed memory.

Data processing system 2100 includes network and port interfaces 2115, such as a port, connector for a dock, or a connector for a USB interface, FireWire, Thunderbolt, Ethernet, Fibre Channel, etc. to connect the system 2100 with another device, external component, or a network. Exemplary network and port interfaces 2115 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 2100 with another device, external component, or a network and receive stored instructions, data, tokens, etc.

Data processing system 2100 also includes display controller and display device 2120 and one or more input or output ("I/O") devices and interfaces 2125. Display controller and display device 2120 provides a visual user interface for the user. I/O devices 2125 allow a user to provide input to, receive output from, and otherwise transfer data to and from the system. I/O devices 2125 may include a mouse, keypad or a keyboard, a touch panel or a multi-touch input panel, camera, optical scanner, audio input/output (e.g., microphone and/or a speaker), other known I/O devices or a combination of such I/O devices.

Data processing system 2100 is an exemplary representation of one or more of the systems detailed described above. Data processing system 2100 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 2100 may be a network computer, server, or an embedded processing device within another device or consumer electronic product. As used herein, the terms computer, device, system, processing system, processing device, and "apparatus comprising a processing device" may be used interchangeably with data processing system 2100 and include the above-listed exemplary embodiments.

Additional components, not shown, may also be part of data processing system 2100, and, in certain embodiments, fewer components than that shown may also be used in data processing system 2100. It will be apparent from this description that aspects of the inventions may be embodied, at least in part, in software. That is, the computer-implemented method(s) detailed herein may be carried out in a computer system or other data processing system 2100 in response to its processor or processing system executing sequences of instructions contained in a memory, such as memory 2110 or other non-transitory machine-readable storage medium. The software may further be transmitted or received over a network (not shown) via network and port interfaces 2115. In various embodiments, hardwired circuitry may be used in combination with the software instructions to implement the present embodiments. Thus, the techniques are not limited to any specific combination of hardware circuitry and software, or to any particular source for the instructions executed by data processing system 2100.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. An apparatus comprising: a plurality of light emitting diodes (LEDs) to provide light external to the apparatus; LED driver circuitry to drive the plurality of LEDs to provide light external to the apparatus; and at least one sensor to detect particulate; and controller circuitry coupled to the LED driver circuitry and the controller circuitry is operable to: provide commands to the LED driver circuitry and to receive sensor data from the at least one sensor to detect particulate, and send an alert to an external device upon a detection of particulate by the at least one sensor, wherein the alert is to include information about the particulate detected and the external device is a user device near the apparatus.

2. The apparatus of claim 1, wherein the at least one sensor is a photosensor.

3. The apparatus of claim 1, further comprising:
memory to store particulate information.

4. The apparatus of claim 3, further comprising:
interface circuitry, coupled to the controller circuitry, to send and receive data.

5. The apparatus of claim 4, wherein the interface circuitry is a wireless interface.

6. The apparatus of claim 4, wherein the interface circuitry is a powerline communication interface.

7. The apparatus of claim 1, wherein the controller circuit to output an on/off command to the LED driver circuitry.

8. The apparatus of claim 1, wherein the controller circuit is to output a pulse width modulation (PWM) command to the LED driver circuitry.

9. An apparatus comprising: a plurality of light emitting diodes (LEDs) to provide light external to the apparatus; LED driver circuitry to drive the plurality of LEDs to provide light external to the apparatus; and at least one sensor to detect particulate; and controller circuitry coupled to the LED driver circuitry and the controller circuitry is operable to: provide commands to the LED driver circuitry and to receive sensor data from the at least one sensor to detect particulate, and send an alert to an external device upon a detection of particulate by the at least one sensor, wherein the alert is to include information about the particulate detected and the external device is a management server.

10. The apparatus of claim 9, wherein the at least one sensor is a photosensor.

11. The apparatus of claim 9, further comprising: memory to store particulate information.

12. The apparatus of claim 11, further comprising:
interface circuitry, coupled to the controller circuitry, to send and receive data.

13. The apparatus of claim 12, wherein the interface circuitry is a wireless interface.

14. The apparatus of claim 12, wherein the interface circuitry is a powerline communication interface.

15. The apparatus of claim 9, wherein the controller circuit to output an on/off command to the LED driver circuitry.

16. The apparatus of claim 9, wherein the controller circuit to output a pulse width modulation (PWM) command to the LED driver circuitry.

* * * * *